US012726140B2

(12) United States Patent
Yuzurihara et al.

(10) Patent No.: US 12,726,140 B2
(45) Date of Patent: Sep. 1, 2026

(54) RF BAND POWER SUPPLY DEVICE AND PULSE WIDTH MODULATION CONTROL METHOD

(71) Applicant: KYOSAN ELECTRIC MFG. CO., LTD., Yokohama (JP)

(72) Inventors: Itsuo Yuzurihara, Yokohama (JP); Tomohiro Yoneyama, Yokohama (JP); Shohei Kobayashi, Yokohama (JP); Yu Hosoyamada, Yokohama (JP)

(73) Assignee: KYOSAN ELECTRIC MFG. CO., LTD., Yokohama (JP)

( * ) Notice: Subject to any disclaimer, the term of this patent is extended or adjusted under 35 U.S.C. 154(b) by 102 days.

(21) Appl. No.: 18/574,573

(22) PCT Filed: Jun. 21, 2022

(86) PCT No.: PCT/JP2022/024629
§ 371 (c)(1),
(2) Date: Dec. 27, 2023

(87) PCT Pub. No.: WO2023/032419
PCT Pub. Date: Mar. 9, 2023

(65) Prior Publication Data

US 2024/0291399 A1 Aug. 29, 2024

(30) Foreign Application Priority Data

Aug. 31, 2021 (JP) ................................ 2021-141539

(51) Int. Cl.
*H02M 7/5395* (2006.01)
*H02M 1/00* (2006.01)
(Continued)

(52) U.S. Cl.
CPC ....... *H02M 7/5395* (2013.01); *H02M 1/0054* (2021.05); *H02M 7/48* (2013.01); *H02M 7/5387* (2013.01)

(58) Field of Classification Search
CPC . H02M 7/5387; H02M 1/0054; H02M 7/5395
See application file for complete search history.

(56) References Cited

U.S. PATENT DOCUMENTS 4,723,201 A * 2/1988 Tanamachi .............. H02P 27/08 318/811
5,250,890 A * 10/1993 Tanamachi ........ H02M 7/53873 318/807

(Continued)

FOREIGN PATENT DOCUMENTS

JP 2001-320884 A 11/2001
JP 2006-230195 A 8/2006

(Continued)

OTHER PUBLICATIONS

International Search Report dated Sep. 6, 2022, issued in counterpart International Application No. PCT/JP2022/024629. (2 pages).

(Continued)

*Primary Examiner* — Yusef A Ahmed
(74) *Attorney, Agent, or Firm* — WHDA, LLP

(57) ABSTRACT

A pulse width modulation control according to the present invention is performed such that, when changing a modulation rate of a modulation wave, the modulation rate is continuously changed from a normal modulation region to an overmodulation region, and, the modulation rate is controlled not to be discontinuous between the normal modulation region and the overmodulation region. In the overmodulation region, limiting the modulation rate α prevents a jump phenomenon in pulse width from occurring and the continuity of the pulse width from disappearing due to the jump phenomenon. The upper limit $\alpha_{upper}$ of the modulation (Continued)

rate α is a threshold at which the pulse width of a PWM pulse signal jumps to a duty ratio of 50%, and limits the modulation rate α to less than the threshold.

11 Claims, 11 Drawing Sheets

(51) Int. Cl.
*H02M 7/48* (2007.01)
*H02M 7/5387* (2007.01)

(56) References Cited

U.S. PATENT DOCUMENTS 5,467,262 A * 11/1995 Nakata ...................... B60L 9/22 363/41
5,623,219 A * 4/1997 Karraker .................. H03C 1/00 327/355
5,650,708 A * 7/1997 Sawada ................... B60L 50/51 318/811
5,657,216 A 8/1997 Kaura
6,541,933 B1 * 4/2003 Leggate .................. H02P 27/08 318/599
7,319,763 B2 * 1/2008 Bank ..................... H03F 3/2173 330/10
8,547,716 B2 * 10/2013 Yoneda ............. H02M 7/53871 363/124
11,736,054 B2 * 8/2023 Yamane .................. H02P 21/06 318/811
11,888,422 B2 * 1/2024 Ohsugi ................... H02P 21/50
2001/0015904 A1 * 8/2001 Kimura ................. H02M 7/538 363/131
2003/0142517 A1 * 7/2003 Furukawa ......... H02M 7/53875 363/37
2008/0242463 A1 * 10/2008 Yamada ................ B60W 20/00 903/910
2009/0237013 A1 * 9/2009 Sato ........................ B60L 15/08 318/400.15
2010/0013421 A1 * 1/2010 Itoh ........................ H02P 27/08 318/400.09
2010/0110743 A1 * 5/2010 Yamasaki ......... H02M 7/53873 332/109
2010/0123418 A1 * 5/2010 Itoh ..................... H02P 21/0089 318/400.15
2010/0176757 A1 * 7/2010 Yamakawa ....... H02M 7/53873 318/400.09
2010/0194330 A1 * 8/2010 Hayashi .................. H02P 27/08 318/799
2011/0006598 A1 * 1/2011 Yamakawa ......... H02P 21/0003 307/9.1
2011/0063883 A1 * 3/2011 Hattori .................. H02M 1/126 363/148
2011/0115420 A1 * 5/2011 Yamada .................. H02P 27/04 318/400.09
2011/0187308 A1 * 8/2011 Suhama .................. H02P 21/00 318/798
2011/0273125 A1 * 11/2011 Yamada ................ H02P 27/085 318/503
2012/0140532 A1 * 6/2012 Tallam ............. H02M 7/53875 363/37
2012/0173066 A1 * 7/2012 Yamada ................ H02P 27/085 903/902
2013/0002174 A1 * 1/2013 Okamura ............ B60L 15/2045 318/139
2013/0173108 A1 * 7/2013 Hashimoto ........... B60W 20/00 903/903
2014/0152205 A1 * 6/2014 Nakai ..................... H02P 21/22 318/400.02
2014/0152214 A1 * 6/2014 Furukawa ......... H02M 7/53875 318/400.13
2014/0217941 A1 * 8/2014 Yamada ............. H02P 21/0089 318/400.26
2015/0115797 A1 * 4/2015 Yuzurihara ....... H01J 37/32183 363/40
2015/0357938 A1 * 12/2015 Yamasaki ............... H02P 27/00 363/41
2016/0056771 A1 * 2/2016 Ibusuki ................. H03F 3/2171 381/123
2016/0211790 A1 * 7/2016 Ajima ..................... H02P 27/08
2017/0054421 A1 * 2/2017 Buono .................... H03F 3/185
2017/0279371 A1 * 9/2017 Yamashita ............. H02M 7/48
2018/0076744 A1 * 3/2018 Wolf ......................... H02P 6/10
2018/0219469 A1 * 8/2018 Yamashita ............. H02P 27/08
2018/0219508 A1 * 8/2018 Arisawa .................. H02P 21/18
2019/0253014 A1 * 8/2019 Iwaji ....................... H02P 21/02
2020/0373854 A1 * 11/2020 Tanaka .................... H02M 1/12
2020/0389117 A1 * 12/2020 Takaoka ................ H02M 7/537
2022/0247328 A1 * 8/2022 Ajima ................. H02M 7/5395
2024/0042867 A1 * 2/2024 Hara ....................... B60L 15/08
2024/0048041 A1 * 2/2024 Yuzurihara ......... H02M 7/5395
2024/0297594 A1 * 9/2024 Yuzurihara ....... H01J 37/32174

FOREIGN PATENT DOCUMENTS

JP 20014-2909 A 1/2014
JP 2014-147294 A 8/2014
JP 2014-176239 A 9/2014
JP 2018-64313 A 4/2018
JP 2020-74670 A 5/2020
JP 2021-35152 A 3/2021

OTHER PUBLICATIONS

Extended (supplementary) European Search Report dated Jul. 22, 2025, issued in counterpart EP Application No. 22864007.4.(8 pages).
Office Action dated Jan. 23, 2026, issued in counterpart KR Application No. 10-2024-7004147, with English translation.(10 pages).

* cited by examiner

FIG.10
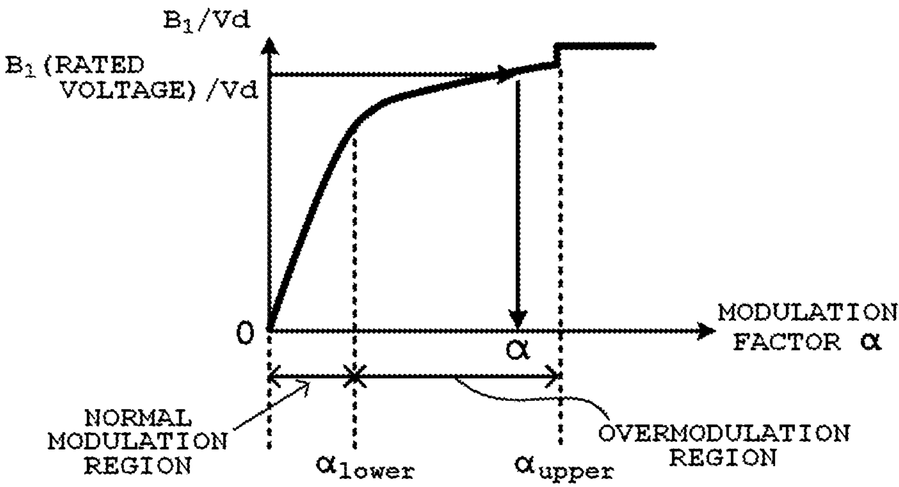
FIG.11
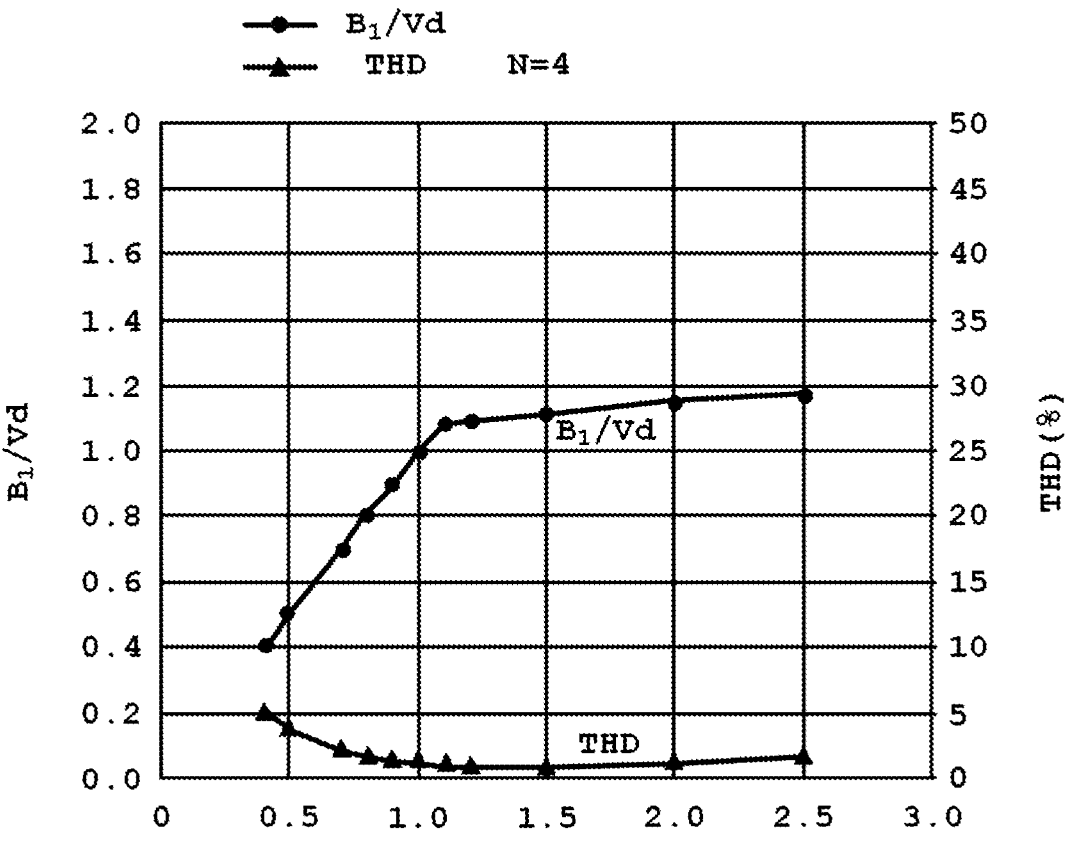

RF BAND POWER SUPPLY DEVICE AND PULSE WIDTH MODULATION CONTROL METHOD

TECHNICAL FIELD

The present invention relates to an RF band power supply device for outputting a sine wave in a radio frequency (RF) band, and to a pulse width modulation control method.

BACKGROUND ART

A radio frequency (RF) band includes a low frequency (LF) band (30 kHz to 300 kHz), a medium frequency (MF) band (300 kHz to 3 MHz), a high frequency (HF) band (3 MHz to 30 MHz), and a very high frequency (VHF) band (30 MHz to 300 MHz).

There are an analog amplifying circuit and a digital amplifying circuit known as amplifying circuits in an RF band. The analog amplifying circuit falls under class-A, class-B or class-C depending on its bias amount. A class-D amplifying circuit is known as a digital amplifying circuit, which is composed of a single-phase square-wave inverter in the RF band.

Conventionally, an RF band power supply device for outputting a sine wave employs any of the class-A to class-C amplifying circuits. However, it is known that such an amplifying circuit has difficulty in increasing in capacity due to low efficiency with a large loss.

A class-D amplifying circuit composed of a single-phase pulse width modulation (PWM) inverter in the RF band includes a class-D full-bridge amplifier formed of a single-phase full-bridge circuit consisting of semiconductor switching elements, such as MOSFETs. The single-phase PWM inverter is used as a power conversion device for performing PWM control on a bridge circuit that switches on and off semiconductor switching elements of the bridge circuit to convert a DC voltage in a DC power source into an AC voltage.

The power conversion device composed of the single-phase PWM inverter compares modulation signals of two modulation waves having phases opposite to each other with a carrier signal of a carrier wave to generate a PWM pulse signal. The generated PWM signal is used to control an ON/OFF switching operation of a switching element of the single-phase PWM inverter to thereby obtain an AC waveform of a sine wave output having a unipolar waveform. Here, two opposing waveforms have opposite polarities and are 180 degrees out of phase with each other, and a unipolar waveform means that the polarity of the waveform is only positive or negative.

Patent Literature 1 discloses a PWM inverter that outputs a sine wave. In addition to that, Patent Literature 2 discloses an inverter device for converting DC power into commercial AC power, in which a frequency of a PWM carrier signal is set to be an integral multiple of a frequency of a current command signal so that switching operations of a first arm and a second arm of a full-bridge circuit can be synchronized with each other. By way of example, it is shown that the frequency of the PWM carrier signal is set to 20 kHz, and the frequency of a current command signal is set to 50 Hz.

It is known that, in the modulation of a PWM inverter, overmodulation control is performed to reduce the number of intersections of a modulation wave and a carrier wave, and consequently the number of switching is reduced that results in the reduction of switching loss, thereby increasing the operation efficiency of the PWM inverter.

CITATION LIST

Patent Literature

[Patent Literature 1] Japanese Patent Laid-Open Publication No. 2014-176239

[Patent Literature 2] Japanese Patent Laid-Open Publication No. 2001-320884

[Patent Literature 3] Japanese Patent Laid-Open Publication No. 2006-230195

SUMMARY OF THE INVENTION

Problems to be Solved by the Invention

There are known merits of the overmodulation control in that the decrease in the number of pulses leads to the reduction of the switching loss, and the increase in power due to the increase in ratio of a fundamental wave component to an input voltage leads to high efficiency and high output power. On the other hand, there is a problem that a jump phenomenon occurs, in which a pulse width of a PWM pulse signal shifts to a width with a duty ratio of 50%, and thereby the continuity of the pulse width is broken.

(Overmodulation)

FIG. 13 illustrates normal modulation control and overmodulation control performed in pulse width control (sine wave modulation control) for a single-phase PWM inverter. In here, the normal modulation control means modulation control with modulation factor that is not in an overmodulation range. FIG. 13(*a*) shows a modulation wave S and a carrier wave C when the pulse width control is performed by the normal modulation control with the modulation factor being 1 or lower. The single-phase PWM inverter uses two opposite sine waves as modulation waves S1, S2 to generate an inverter output voltage having a unipolar waveform. The output voltage of the inverter output has a sine wave at the same frequency as the modulation wave. Two opposite sine waves indicated with a solid line and a broken line represent the modulation waves S1 and S2, respectively, and a triangular wave represents the carrier wave C. FIG. 13(*b*) shows a PWM pulse signal obtained by comparing modulation signals of the modulation waves S1, S2 with a carrier signal of the carrier wave C.

FIG. 13(*c*) shows the modulation waves S (S1, S2) and the carrier wave C in the overmodulation control with the modulation factor exceeding 1, and FIG. 13(*d*) shows a PWM pulse signal. Provided that the modulation factor of the modulation wave S is $\alpha$ and a peak value of the triangular wave of the carrier wave C is 1, the overmodulation occurs when the modulation wave S exceeds 1 in a phase $\theta$ in which the triangular wave reaches its peak.

If the modulation wave S with the modulation factor $\alpha$ is greater than the peak value of the triangular wave, the number of the points of intersection with the carrier wave C decreases. Consequently, the number of the pulses of the obtained PWM pulse signal decreases compared to the number of the pulses obtained by the sine wave modulation control employing the normal modulation control, resulting in the reduction of the switching loss.

FIGS. 13(*e*) and 13(*f*) show cases where the modulation factor in the overmodulation control becomes larger. In these cases, the number of the points of intersection of the modulation wave S and the carrier wave C is 2 in a half period of the modulation wave, and the obtained PWM pulse signal has one pulse in the half period.

FIG. 14 illustrates the jump phenomenon of the pulse width in the overmodulation control. FIGS. 14(*a*) and 14(*b*) show boundary points where the modulation wave S intersects the carrier wave C in the half period of the modulation wave, and the modulation wave S does not intersect the carrier wave C beyond the boundary point. Since the points of intersection at the boundary point occur at both edges in one period of the modulation wave, only one PWM pulse signal having a pulse width sandwiched between the two points of intersection is generated.

On the other hand, FIGS. 14(*c*) and 14(*d*) show cases where the modulation wave S does not intersect the carrier wave C in the half period of the modulation wave due to the increase in the modulation factor. In these cases, the pulse width of the PWM pulse signal shifts to a pulse width with a duty ratio of 50%. There is no continuity between the shifted pulse width with the duty ratio of 50% and the pulse width at the boundary point shown in FIG. 14(*b*) (a pulse width of the PWM pulse signal indicated with a broken line in FIG. 14(*d*)), and thus the pulse widths are discontinuous. The discontinuity of the pulse widths appears as the jump phenomenon.

Due to the increase in the modulation factor in the overmodulation control, all of the pulse widths of the generated PWM pulse signals have the duty ratio of 50% when the modulation wave S exceeds the boundary point at which the modulation wave S intersects the carrier wave C, resulting in the discontinuity of the pulse widths. It causes a problem that the continuity of the PWM pulse width control cannot be maintained.

(Difference in Jump Phenomenons in RF Band and Commercial Frequency Band)

A description will now be made about a difference in jump phenomenons in an RF band and a commercial frequency band. The frequency band of the sine wave output from the PWM inverter of the present invention is an RF band. A jump phenomenon in the RF band shows a different aspect from that at the commercial frequency.

(a) Jump Phenomenon in Commercial Frequency Band

In order to prevent the number of the pulses from fluctuating in the one period of the modulation wave in the normal modulation control in the PWM inverter, a relationship of $fc=N\cdot fs$ is established between a modulation wave frequency fs and a carrier wave frequency fc with an unknown N being an integer. The integer N representing the relationship between the modulation wave frequency fs and the carrier wave frequency fc corresponds to the number of switching pulses present in the one period of the modulation wave, the switching pulses being for drive control on a switching element.

In the commercial frequency band, when the modulation wave frequency fs is 60 Hz and the carrier wave frequency fc is 21 kHz, the number of PWM pulses N is 350 (=21 kHz/60 Hz).

Provided that the number of PWM pulses N is set to 350 and the overmodulation control is employed, conductivity in a modulation state right before a 1-pulse mode that causes the jump phenomenon is $(N-1)/(2\cdot N)=(350-1)/(2\cdot 350)=0.499$. On the other hand, conductivity in the 1-pulse mode after occurring the jump phenomenon is 0.5 and a wave is square. Output voltage fluctuation rate before and after the occurrence of the jump phenomenon is $\{(0.5-0.499)/0.5\}\times 100\%=0.2\%$. Output voltage fluctuation rate in a jumping portion is ±0.1% based on zero, so that the jump phenomenon will be almost negligible in the commercial frequency band.

In motor control, the modulation wave frequency fs is 1 Hz to 200 Hz, the carrier wave frequency fc is 20 kHz and the number of pulses N is 20,000 to 100. Thus, the jump of the output voltage will not occur.

Patent Literature 3 discloses motor control for an electric vehicle having a multi-pulse mode that interposes an overmodulation control mode between a pulse width modulation control mode for outputting a plurality of voltage pulses in a half period of an output voltage fundamental wave and a 1-pulse control mode for outputting a single voltage pulse in the half period of the output voltage fundamental wave. Between the overmodulation control mode and the 1-pulse mode in Patent Literature 3, a discontinuous operation is occurred on an output voltage.

In the 1-pulse mode by the overmodulation control, conductivity d in a modulation state right before the occurrence of the jump phenomenon is expressed by $d=(N-1)/(N\cdot 2)$. Thus, in a range of the number of pulses N from 20,000 to 100, the conductivity d when N=20,000 is 0.49998, and the conductivity d when N=100 is 0.495. After the occurrence of the jump phenomenon, the conductivity of the 1-pulse mode is 0.5 and the wave is square. When N=100, the output voltage fluctuation rate before and after the occurrence of the jump phenomenon is 1%. Thus, the output voltage fluctuation rate in the jumping portion is ±0.5%. The voltage fluctuation of ±0.5% occurring in the jump phenomenon in the 1-pulse mode will not really be a problem in motor driving.

The jump phenomenon that is a problem caused by using a small number of the pulses in the RF band in the overmodulation mode can be ignored in a low frequency band in the inverter control in Patent Literature 3 because the number of the pulses is large in the low frequency band.

In Patent Literature 3, the multi-pulse mode in the overmodulation control does not synchronize the modulation wave with the carrier wave. Since the modulation wave is not synchronized with the carrier wave, the carrier wave frequency is required to be sufficiently higher than the modulation wave frequency.

(b) Jump Phenomenon in RF Frequency Band

By contrast, the carrier wave frequency in the RF frequency band is very high because the frequency band is a high frequency band. When the large number of pulses N is applied to the high carrier wave frequency, the switching loss becomes excessive and thus is not suitable for the RF band power supply device. For that reason, the small number of pulses N is used in the RF band.

In a case of setting the number of pulses N to be small in the RF band, the fluctuations in the conductivity before and after the occurrence of the jump phenomenon becomes too large to ignore. For example, when N is 4, the conductivity before the occurrence of the jump phenomenon is $(N-1)/(2\cdot N)=(4-1)/(2\cdot 4)=0.375$, and a difference of the conductivity 0.125 (=0.5−0.375) from the conductivity of 0.5 after the occurrence of the jump phenomenon is large compared with a difference of the conductivity of 0.001 (=0.5−0.499) from the conductivity in the commercial frequency band. Thus, the jump phenomenon cannot be ignored in the RF frequency band.

Accordingly, there is a problem associated with the overmodulation control in the RF band that the pulse widths are discontinuous due to the jump phenomenon in which the pulse width of the PWM pulse signal shifts to the pulse width with the duty ratio of 50%.

An object of the present invention is to solve the above-described existing problems and to prevent the occurrence of the jump phenomenon in which the pulse width of the PWM pulse signal shifts to the pulse width with the duty ratio of 50% in the overmodulation control, thereby preventing the pulse width from becoming discontinuous.

Means for Solving the Problem

The present invention relates to a pulse width modulation control method and an RF band power supply device on which pulse width modulation control is performed. The pulse width modulation control method and the RF band power supply device are for outputting a sine wave in an RF band. In inverter control according to the invention, a modulation wave frequency fs of a modulation signal and a carrier wave frequency fc of a carrier signal are used for outputting the sine wave in the RF band, the modulation wave frequency fs being a high frequency in the RF band and the carrier wave frequency fc being higher than the modulation wave frequency fs. In here, the RF band includes an LF band (30 kHz to 300 kHz), a MF band (300 kHz to 3 MHz), an HF band (3 MHz to 30 MHz), and a VHF band (30 MHz to 300 MHz).

The pulse width modulation control of the invention is pulse width modulation (PWM) control for a single-phase PWM inverter, in which a gate signal is generated based on a comparison of a modulation signal having a sine wave in an RF band and a carrier signal having a triangular wave, so as to use the generated gate signal as a PWM pulse signal for performing the pulse width modulation (PWM) control on the single-phase PWM inverter. The RF band power supply device performs the pulse width modulation control to output a sine wave in the RF band.

The pulse width modulation control of the invention uses a frequency in the RF band as a modulation wave frequency fs of the sine wave modulation signal, and also uses, as a carrier wave frequency fc of the triangular wave carrier signal, a frequency that is an even number N times higher than the modulation wave frequency fs.

The pulse width modulation control of the invention varies a modulation factor continuously from a normal modulation region to an overmodulation region in the variation of the modulation factor by using the sine wave as a waveform of the modulation wave, and controls the modulation factor in the normal modulation region and the overmodulation region such that the modulation factor in the normal modulation region in general and the modulation factor in the overmodulation region are not discontinuous, thereby preventing a jump phenomenon. In here, the term "modulation factor" used in both of the normal modulation region and the overmodulation region is referred to as modulation factor with a sign $\alpha$.

When a modulation wave $\alpha \cdot \sin\theta$ having a sine wave exceeds 1 at a peak of a carrier wave having a triangular wave of amplitude 1 as the modulation factor $\alpha$ is varied, a PWM pulse signal disappears in a section of the concerned modulation factor, and consequently the modulation factor shifts from the normal modulation region to the overmodulation region. In the overmodulation region, the section, where the PWM pulse signal disappears, expands as the modulation factor $\alpha$ increases, and thus one PWM pulse signal will be generated in a half period of the modulation wave. The pulse width of the PWM pulse signal grows as the modulation factor $\alpha$ increases further, and the duty ratio of the pulse width jumps to 50% when the modulation wave does not overlap with the carrier wave. Due to this jump, the continuity of the pulse width before and after the jump phenomenon is lost. The present invention defines an upper limit value $\alpha_{upper}$ of the modulation factor $\alpha$, and controls the modulation factor $\alpha$ not to exceed the upper limit value $\alpha_{upper}$, so as to prevent the pulse width from shifting to the duty ratio of 50% and jumping.

The present invention controls the modulation factor $\alpha$ in the overmodulation region to prevent the occurrence of the jump phenomenon of the pulse width and thus prevent the pulse width from being discontinuous due to the jump phenomenon, thereby securing the continuity of the pulse width in the overmodulation region. The upper limit value $\alpha_{upper}$ of the modulation factor $\alpha$ is a threshold at which the pulse width of the PWM pulse signal jumps to the width with the duty ratio of 50%. The modulation factor $\alpha$ is limited lower than the threshold value.

<RF Band Power Supply Device>

The RF band power supply device of the present invention includes a DC power source, a single-phase PWM inverter that converts a direct current supplied from the DC power source into an alternate current, a low-pass filter circuit that removes a harmonic component in an AC output in the single-phase PWM inverter to output a sine wave, and an inverter controller that performs pulse width modulation on the single-phase PWM inverter.

The inverter controller includes a PWM control unit that generates a PWM pulse signal to be used for the pulse width modulation by comparing the sine wave modulation signal with the triangular wave carrier signal, and a modulation signal/carrier signal generation unit that generates a modulation signal and a carrier signal.

Furthermore, the modulation signal/carrier signal generation unit includes a modulation control unit that controls the modulation factor of the modulation signal. The modulation control unit has:

(a) a function of imposing an upper limit on the modulation factor in the overmodulation region that is lower than a threshold value at which the pulse width of the PWM pulse signal jumps to a pulse width with the duty ratio of 50%, thereby maintaining the continuity of the pulse widths of the PWM pulse signal; and (b) a function of making the modulation factor to possess the continuity from the normal modulation region to the overmodulation region, so as to make the modulation wave of the modulation signal to be a sine wave that is continuous from the normal modulation region to the overmodulation region.

(Single-Phase PWM Inverter)

The single-phase PWM inverter includes a single-phase full-bridge circuit formed by connecting two legs in parallel between a positive terminal and a negative terminal of the DC power source, each leg having upper and lower arms on which switching elements are disposed, and is configured to perform an ON/OFF operation on each switching element to transform a DC input supplied by the DC power source into an AC output.

(Inverter Controller)

The inverter controller is configured to generate a gate signal based on a comparison of two modulation waves, of which phases are opposite to each other, with a carrier wave, and use the generated gate signal as a PWM pulse signal to perform the ON/OFF operation on each switching element of the single-phase full-bridge circuit to perform the pulse width modulation on the single-phase PWM inverter.

(Modulation Signal Generation Unit)

A modulation signal generation unit is configured to generate a modulation wave $\alpha \cdot \sin(2\pi \cdot fs \cdot t)$ of a sine wave based on the modulation wave frequency fs and the modulation factor α controlled by the modulation control unit.

(Carrier Signal Generation Unit)

A carrier signal generation unit is configured to generate a triangular wave at a carrier frequency fc=N·fs based on the modulation wave frequency fs and the number of pulses N. Thus, there is a relationship of an integer multiple N between the modulation wave frequency fs and the carrier frequency fc.

The RF band power supply device of the invention has the following requirements with reference to (A) conditions of the modulation factor, (B), (C) overmodulation lower limit value/upper limit value of the modulation factor, and (D) a range of the modulation factor.

(A) Conditions of Modulation Factor

In an overmodulation state, when the maximum amplitude of the carrier wave of the triangular wave is 1, the amplitude α·sin θ of the modulation wave of the sine wave satisfies a relationship of (α·sin θ>1). In the half period of the modulation wave, there is a condition that the modulation wave in the overmodulation state exceeds the peak value of the triangular wave in k-th section k where the modulation wave intersects the triangular wave, and thus the modulation factor α in the overmodulation state is expressed by the following formula (1), where N is the number of PWM pulses.

$$\alpha > 1/\sin\left(2\pi(k+1/4)/N\right) \tag{1}$$

(B) Overmodulation Lower Limit Value of Modulation Factor

In the overmodulation state where the amplitude α·sin θ of the modulation wave of the sine wave is in the relationship of (α·sin θ>1), the peak value of a modulation wave appears in π/2 which is a phase in a quarter period of the modulation wave, so that the overmodulation lower limit value in the overmodulation region appears in a section of k=INT(N/4). INT(n) represents an integer part of "n". When "INT(N/4)" is substituted into "k" in the above formula (1), an overmodulation lower limit value $\alpha_{lower}$ of the modulation factor α is expressed by the following formula (2).

$$\alpha_{lower} = 1/\sin\left[2\pi\left\{INT\left(N/4\right)+1/4\right\}/N\right] \tag{2}$$

Around the peak of the modulation wave, the modulation wave comes into contact with the peak of the carrier wave, and a threshold value of the modulation factor remaining in the overmodulation state at the point of contact with the peak of the carrier wave is defined as the overmodulation lower limit value $\alpha_{lower}$ of the modulation factor. The peak of the modulation wave appears in a quarter period and a three fourths period of the modulation wave. On the overmodulation lower limit value $\alpha_{lower}$ of the modulation factor, the peak of the carrier wave comes into contact with the modulation wave on the peak sides in the quarter period and the three fourths period of the modulation wave. When the modulation factor α is lower than the overmodulation lower limit value $\alpha_{lower}$ of the modulation factor, the modulation wave intersects the carrier wave in each period of the carrier wave, so that the modulation factor does not enter the overmodulation state.

The modulation factor α is in the overmodulation state when the modulation factor α is higher than the overmodulation lower limit value $\alpha_{lower}$ of the modulation factor, whereas the modulation factor α is in the normal modulation state when the modulation factor α is lower than the overmodulation lower limit value $\alpha_{lower}$ of the modulation factor α. This can be said that the overmodulation lower limit value $\alpha_{lower}$ of the modulation factor α is also the upper limit value of the modulation factor.

(C) Upper Limit Value of Modulation Factor

The upper limit value $\alpha_{upper}$ of the modulation factor α is a value at which the jump phenomenon occurs, in which the pulse width of the PWM pulse signal shifts to the pulse width with the duty ratio of 50%. The pulse width becomes discontinuous around the upper limit value $\alpha_{upper}$, so that the continuity of the modulation factor cannot be maintained. The upper limit value $\alpha_{upper}$ of the modulation factor α corresponds to k=0 at which the section k is the edge of the period of the modulation wave. When "0" is substituted into "k" in the above formula (1), the upper limit value $\alpha_{upper}$ of the modulation factor α is expressed by the following formula (3), where N is the number of PWM pulses.

$$\alpha_{upper} = 1/\sin(\pi/2N) \tag{3}$$

At k=0 which is the edge of an inner circumference of one period of the modulation wave, the modulation wave comes into contact with the peak of the carrier wave, and a threshold value of the modulation factor remaining in the normal modulation state at the point of the concerned contact is defined as the upper limit value $\alpha_{upper}$ of the modulation factor α. At the upper limit value $\alpha_{upper}$ of the modulation factor α, the peak of the carrier wave comes into contact with the modulation wave at k=0 which is on the edge side of the inner circumference near 0 and 2π in the one period of the modulation wave. When the modulation factor α is higher than the upper limit value $\alpha_{upper}$ of the modulation factor, the modulation wave does not intersect the carrier wave in phases except for a phase nπ (n is 0 or an integer). The upper limit value $\alpha_{upper}$ of the modulation factor α is a value at which the jump phenomenon occurs, in which the pulse width of the PWM pulse signal shifts to the pulse width with the duty ratio of 50%, and the pulse widths become discontinuous around the upper limit value $\alpha_{upper}$. The upper limit value is set for the modulation factor in the overmodulation state so that the continuity can be maintained from the normal modulation to the upper limit of the overmodulation.

(D) Range of Modulation Factor

The range of modulation factor is expressed by the following inequality (4) based on the overmodulation lower limit value $\alpha_{lower}$ and the upper limit value $\alpha_{upper}$ of the modulation factor α.

$$1/\sin\left[2\pi\left\{INT\left(N/4\right)+1/4\right\}/N\right] < \alpha < 1/\sin\left(\pi/2N\right) \tag{4}$$

<Pulse Width Modulation Control Method>

The pulse width modulation control method of the present invention is a control method for performing pulse width modulation control on the single-phase PWM inverter, the method using a gate signal generated based on a comparison of two modulation signals having opposite phases in an RF band and a carrier signal to perform the pulse width modulation control on the single-phase inverter, thereby outputting a sine wave in the RF band.

A modulation wave of the modulation signal is a sine wave, and a carrier wave of the carrier signal is a triangular wave. The range of modulation for the modulation signal is between a normal modulation region and an overmodulation region depending on a modulation factor, the modulation factor in the overmodulation region of the invention has its upper limit set as below.

(a) The upper limit is set by defining the modulation factor in the overmodulation region to be less than a threshold value at which a pulse width of a PWM pulse signal jumps to a width with a duty ratio of 50%, so as to maintain continuity of the pulse widths of the PWM pulse signal.

(b) The modulation factor from the normal modulation region to the overmodulation region is made to possess the continuity, so as to make the modulation wave of the modulation signal to be the sine wave that is continuous from the normal modulation region to the overmodulation region.

The pulse width modulation control method of the invention has the requirements with reference to (A) the conditions of the modulation factor, (B), (C) the overmodulation lower limit value/upper limit value of the modulation factor, and (D) the range of the modulation factor, which are similar to those in the RF band power supply device of the invention.

The RF band power supply device and the pulse width modulation control method of the present invention have the following effects.

An effect of preventing the occurrence of the jump phenomenon, in which the pulse width of the PWM pulse signal shifts to the pulse width with the duty ratio of 50% and preventing the discontinuity of the pulse widths in the overmodulation control.

An effect of high power of an output voltage by using a modulation factor that can achieve a large fundamental wave component ratio in the overmodulation region.

An effect of reducing a switching loss by decreasing the number of times of switching.

An effect of increasing efficiency in the pulse width modulation by reducing the switching loss.

Effect of the Invention

As described above, according to the present invention, it is possible to prevent the occurrence of the jump phenomenon in the overmodulation control, in which the pulse width of the PWM pulse signal shifts to the pulse width with the duty ratio of 50%, and thus prevent the discontinuity of the pulse widths.

BRIEF DESCRIPTION OF THE DRAWINGS

FIG. 10 shows the fundamental wave component ratio $B_1/Vd$ with respect to the modulation factor $\alpha$;

FIG. 11 shows the fundamental wave component ratio $B_1/Vd$ and a THD with respect to the modulation factor «;

BEST MODE FOR CARRYING OUT THE INVENTION

A description will be made about a schematic configuration of an RF band power supply device of the present invention on the basis of FIG. 1, a description will be made about overmodulation control on the basis of FIGS. 2 to 11, and a description will be made about a configuration example of the RF band power supply device of the invention on the basis of FIG. 12.

(Schematic Configuration of RF Band Power Supply Device of Present Invention)

Figure 1:
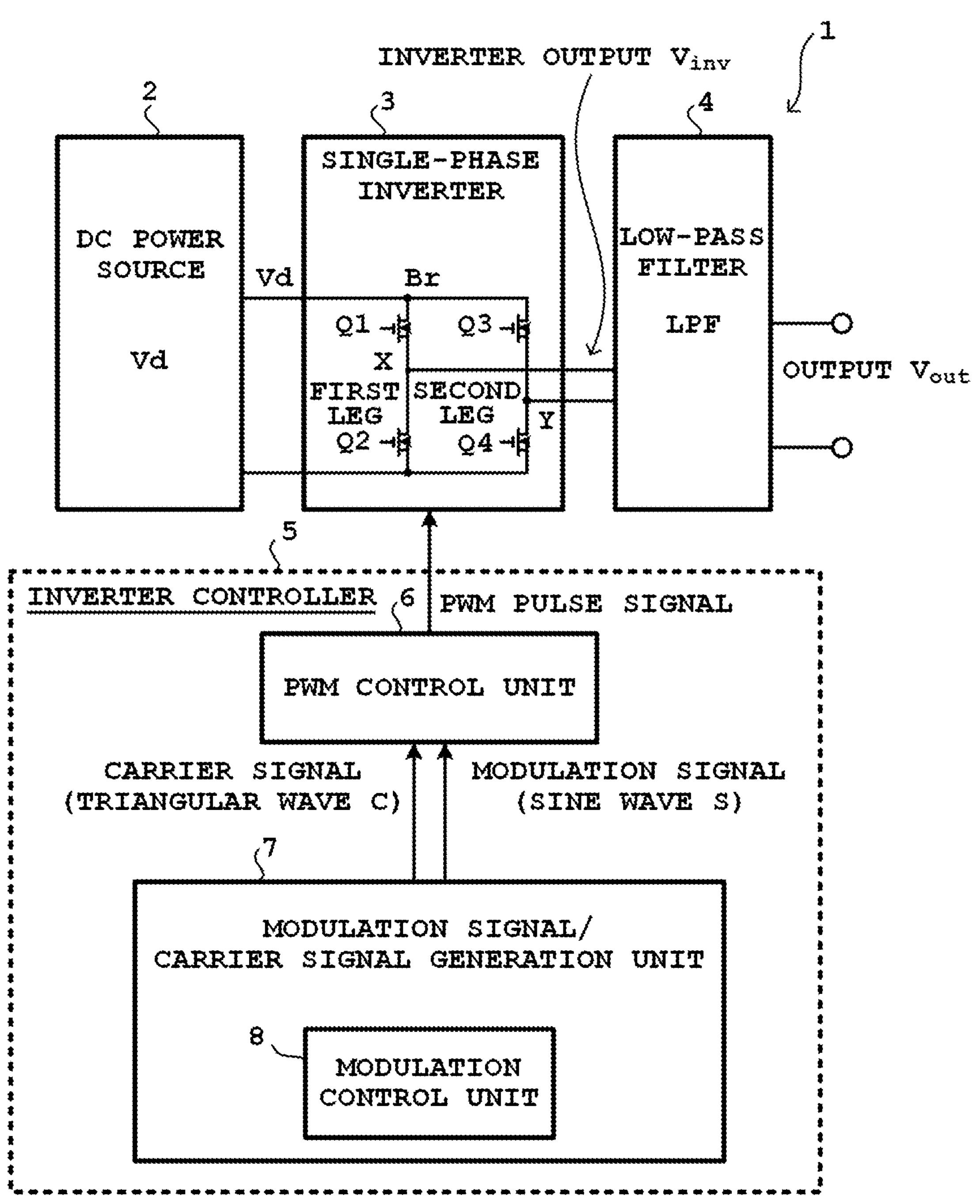
FIG. 1 illustrates a schematic configuration of an RF band power supply device of the present invention.

FIG. 1 shows the schematic configuration of the RF band power supply device of the present invention. An RF band power supply device 1 includes a DC power source 2, a single-phase PWM inverter 3 that converts a DC voltage Vd supplied from the DC power source 2 into an AC inverter output $V_{inv}$, a low-pass filter 4 that removes a harmonic component in an AC output from the single-phase PWM inverter 3 to generate a sine wave output $V_{out}$, and an inverter controller 5 that performs pulse width modulation on the single-phase PWM inverter 3.

The inverter controller 5 includes a PWM control unit 6 that generates a PWM pulse signal for use in the pulse width modulation by comparing a modulation signal (S) having a sine wave with a carrier signal (C) having a triangular wave, and a modulation signal/carrier signal generation unit 7 that generates a modulation signal and a carrier signal.

The modulation signal/carrier signal generation unit 7 has a modulation control unit 8, the modulation control unit 8 performing a modulation factor of a modulation signal. The modulation control unit 8 has:

(a) a function of imposing an upper limit on the modulation factor in an overmodulation region that is less than a threshold value at which a pulse width of a PWM pulse signal jumps to a pulse width with a duty ratio of 50%, thereby maintaining the continuity of the pulse widths of the PWM pulse signal; and (b) a function of making the modulation factor to possess the continuity from a normal modulation region to the overmodulation region, so as to make a modulation wave of the modulation signal to be a sine wave that is continuous from the normal modulation region to the overmodulation region.

(Modulation Control of Present Invention)

Figure 2:
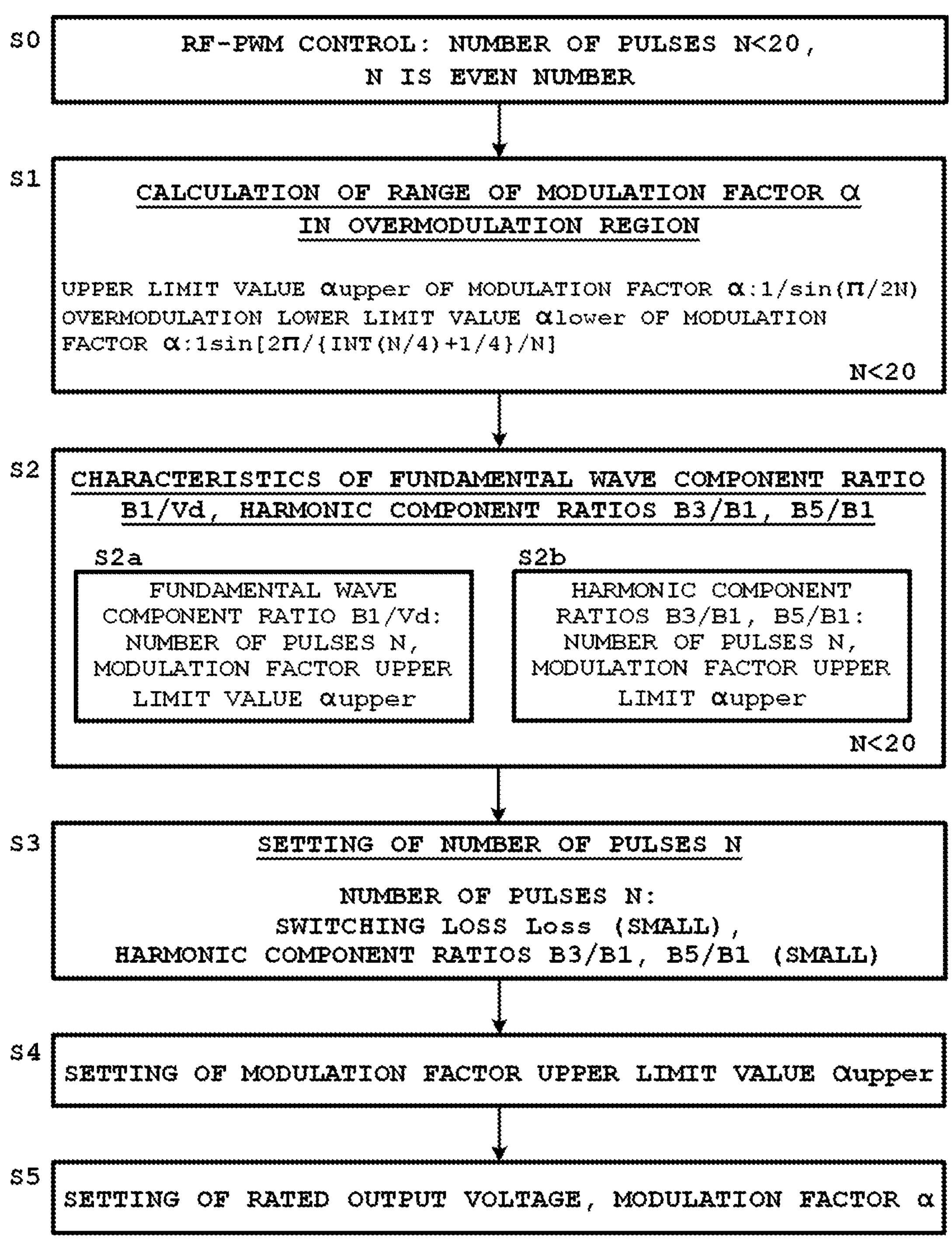
FIG. 2 illustrates a relationship between Steps (S0) to (S5) of the present invention.

Normal modulation control and overmodulation control in the modulation control of the present invention will be described in Steps (S0) to (S5) shown in FIG. 2. It is to be noted that Steps (S0) to (S5) do not represent control steps in time sequence of a control flow in the invention.

The normal modulation control will be described as an example of RF-PWM control in (S0). In regard to the overmodulation control, a description will be made about each step, i.e., (S1) a range of a modulation factor $\alpha$ in the overmodulation region, (S2) characteristics of a fundamental wave component ratio and a harmonic component ratio, (S3) setting of the number of pulses N, (S4) setting of an upper limit value $\alpha_{upper}$ of the modulation factor $\alpha$, and (S5) setting of the modulation factor $\alpha$.

(S0) RF-PWM Control

First, a description will be made about the normal modulation control in pulse width modulation control (PWM control) in an RF band.

Figure 3:
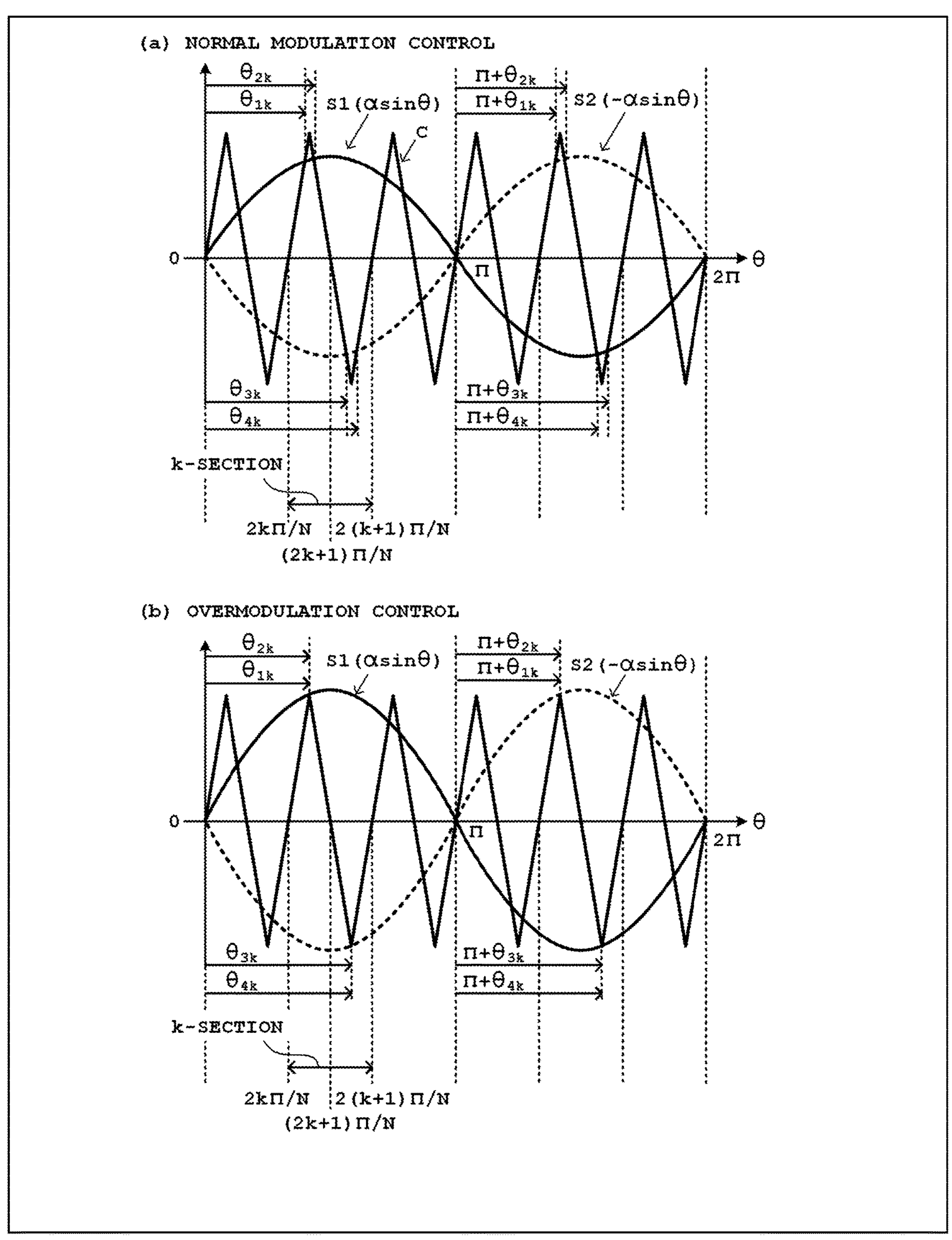
FIG. 3 illustrates a modulation wave and a carrier wave in pulse width modulation (PWM) control.

Pulse Width Modulation Control by Normal Modulation Control:

The pulse width modulation (PWM) control by the normal modulation control will be described by referring to FIG. 3. FIG. 3 shows one period of a modulation wave S and a carrier wave C included in the one period of the modulation wave S.

FIG. 3 illustrates that the one period of the modulation wave S includes six periods of the carrier wave C, and the number of pulses N is six. The figure shows an example of the number of pulses N, and the number of pulses N in the RF band is smaller than the number of pulses N in a commercial frequency band.

The modulation wave S is determined by a product of a modulation command signal and the modulation factor $\alpha$, and provided that the modulation command signal is a sine wave with an amplitude of 1, the modulation wave S is expressed by $\alpha \cdot \sin\theta$. The carrier wave C can be a triangular wave, for instance. The figure shows a triangular wave with amplitude of 1 in both of positive and negative sides. The PWM pulse signal is generated by comparing the modulation signal of the modulation wave S with the carrier signal of the carrier wave C.

FIG. 3(*a*) shows two modulation waves S1, S2 having opposite phases as the modulation wave S and the carrier wave C. The modulation wave S1 is indicated with a solid line, and the modulation wave S2 is indicated with a broken line. The modulation wave S1 is expressed by a product ($\alpha \cdot \sin\theta$) of a modulation wave command signal ($\sin\theta$) and the modulation factor $\alpha$, and the modulation wave S2 is expressed by a product ($-\alpha \cdot \sin\theta$) of a modulation wave command signal ($-\sin\theta$) and the modulation factor $\alpha$. The PWM pulse signal is generated based on a phase position of a point of intersection of the two modulation waves S1, S2 and the carrier wave C.

The carrier wave C and the modulation wave S (S1, S2) are subjected to odd function control, and the period and the phase of the carrier wave C are synchronized with those of the modulation wave S so that the carrier wave C is symmetrical about a point, at which the plus and the minus of the carrier wave C are reversed at a phase time point, which is point n in the figure, in a half period of the modulation wave S as a reference time point.

Frequency synchronization control is performed for multiplying a modulation wave frequency fs of the modulation wave signal by an even number of pulses N to obtain a result N·fs as a carrier wave frequency fc of the carrier signal. The carrier wave frequency fc is the integer multiple of the modulation wave frequency fs, so that the frequency of the modulation wave S is synchronized with the frequency of the carrier wave C.

Phase synchronization control is performed for synchronizing a phase of the modulation wave with a phase of the carrier wave in each period of the modulation wave to prevent a phase deviation. Since the modulation wave and the carrier wave are subjected to the odd function control, the same phase relationship of the carrier wave in one period of the modulation wave is ensured in each period.

In a case where the numbers of pulses and carrier waves in one period of the modulation wave S are set to an even number N, the numbers of pulses and carriers included in a half period is N/2. In this connection, a character "k" is defined as an ordinal number that indicates a sequence of the carrier waves counting from the end of phase zero in one period of the modulation wave S. An equality k=0 represents a section in which a carrier wave corresponding to the end of the phase zero exists, and an equality k=N−1 represents a section in which a carrier wave corresponding to the end of a phase $2\pi$ in one period exists. Furthermore, an equality k=N/2−1 represents a section in which a carrier wave corresponding to the end of an anterior half period exists with respect to a phase $\pi$ in the half period, and an equality k=N/2 represents a section in which a carrier wave corresponding to the end of a posterior half period exists with respect to the phase r in the half period.

(S1) Range of Modulation Factor $\alpha$ in Overmodulation Region (S1*a*) Condition of Overmodulation State The amplitude of the modulation wave S is expressed as ($\alpha \cdot \sin\theta$) obtained by multiplying the modulation wave command signal sine of the sine wave by the modulation factor $\alpha$. When an inequality ($\alpha \cdot \sin\theta$)>1 is satisfied at a point of peak value 1 of the triangular wave of the carrier signal, the modulation factor is in an overmodulation state.

FIG. 3(*a*) shows a normal modulation state, and FIG. 3(*b*) shows the overmodulation state.

In the normal modulation state in FIG. 3(*a*), in a k-section [$2k\pi/N$ to $2(k+1)\pi/N$] in a half period from zero to $\pi$, the modulation wave S1 intersects the carrier wave C at a point 1k and a point 2k, and the phase angles of these points of intersection are $\theta_{1k}$ and $\theta_{2k}$, respectively. In addition to that, points of intersection 3k and 4k where the modulation wave S2 intersects the carrier wave C have the phase angles of $\theta_{3k}$ and $\theta_{4k}$, respectively. Furthermore, in a k-section [$\pi+2k\pi/N$ to $\pi+2(k+1)\pi/N$] in a half period from $\pi$ to $2\pi$, phase angles at points where the modulation wave S1 intersects the carrier wave C are $\pi+\theta_{1k}$ and $\pi+\theta_{2k}$, respectively, and phase angles at points where the modulation wave S2 intersects the carrier wave C are $\pi+\theta_{3k}$ and $\pi+\theta_{4k}$, respectively.

In the overmodulation state in FIG. 3(*b*), the overmodulation state is a status that the value ($\alpha \cdot \sin\theta$) exceeds the peak value 1 of the triangular wave in the k-section. In the overmodulation state, there is conformity between the amplitudes and the phases of the point 1k and the point 2k at which the modulation wave intersects the triangular wave in the k-section, and the phase angles indicate the threshold value to go into the overmodulation state in the k-section.

Thus, conditional expressions for going into the overmodulation state are expressed by the following condition expressions (5).

$$\alpha \cdot \sin\theta_{1k} = \alpha \cdot \sin\theta_{2k} > 1 \tag{5}$$

$$\theta_{1k} = \theta_{2k} = 2\pi(k+1/4)/N$$

$$\alpha > 1/\sin\{2\pi(k+1/4)/N\}$$

In the k-section, when the modulation factor α does not satisfy the condition of the expressions (5), a pulse is generated in the normal modulation state. By contrast, when the modulation factor α satisfies the expressions (5), the k-section is in the overmodulation state, and thereby the generation of a pulse is prevented in this section.

(S1*b*) Upper Limit Value of Modulation Factor α

The number of sections that go into the overmodulation state increases as the modulation factor α increases, and eventually only the k=0-section remains in the normal modulation state. When the modulation factor α exceeds the upper limit, the k=0-section also goes into the overmodulation state, causing the jump of the pulse width to the duty ratio of 50%. This jump phenomenon causes the pulse width to lose continuity.

In order to maintain the continuity of the pulse width and prevent the pulse width from jumping to the duty ratio of 50%, k=0-section has to remain in the normal modulation state. The present invention limits the modulation factor α to keep the k=0-section in the normal modulation state. The modulation factor α can be limited based on the upper limit value $\alpha_{upper}$ of the modulation factor α in the k=0-section.

The upper limit value $\alpha_{upper}$ of the modulation factor α is expressed by the following formula (6) based on the condition expression of the overmodulation state indicated by the expression (5).

$$\alpha_{upper} = 1/\sin(\pi/2N) \tag{6}$$

When the modulation factor α is α≥1/sin(π/2N), the pulse width shifts and jump to the pulse width with the duty ratio of 50%. On the other hand, when the modulation factor α is α<1/sin(π/2N), the pulse width does not jump and its continuity is maintained.

Figure 4:
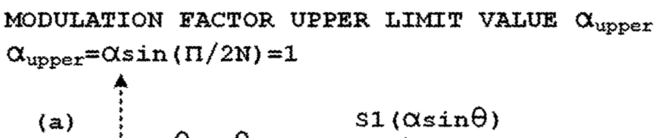
FIG. 4 illustrates an upper limit value and an overmodulation lower limit value of a modulation factor $\alpha$.
Figure 4:
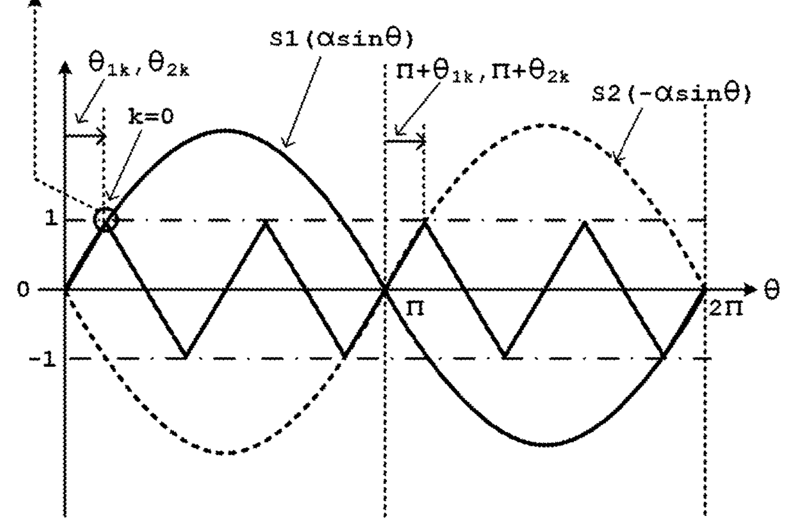
Figure 4:
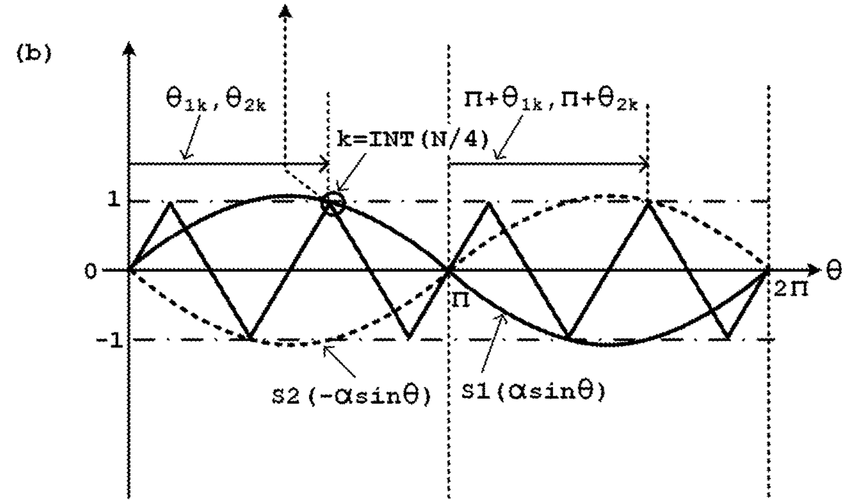

FIG. 4(*a*) illustrates the upper limit value of the modulation factor. The modulation wave S1 (α·sin θ) intersects the carrier wave of the triangular wave at the point of $\theta_{1k}=\theta_{2k}$ in the k=0-section. When the amplitude of the modulation wave S1 becomes larger beyond the point of intersection due to the increase in the modulation factor α, the modulation wave S1 does not intersects the triangular wave, and thereby the duty of the pulse width shifts to the duty of 50% which leads to the occurrence of jump.

Comparison Between Commercial Frequency Band and RF Band

The number of pulses N in a PWM inverter using a commercial frequency of 60 Hz is N=350. The modulation factor α that jumps in the overmodulation region with N=350 is α=1/sin{π/(2×350)}=222.8 according to the formula (6).

After the jump occurs due to the modulation factor of α>222.8, the pulse waveform becomes a square wave with conductivity of 0.5. The conductivity immediately before the jump at α=222.8 is (N−1)/(2N)=(350−1)/(2×350)=0.499 that is approximately 0.5. Thus, in the case of the number of pulses N for using the commercial frequency, the jump phenomenon can be ignored.

Some examples of the modulation factor α that jumps in the RF band will be presented below.

The modulation factor α that jumps when N=6 is α=1/sin(π/12)=3.864.

The modulation factor α that jumps when N=4 is α=1/sin(π/8)=2.613.

The modulation factor α that jumps when N=2 is α=1/sin(π/4)=1.414.

(S1*c*) Overmodulation Lower Limit Value of Modulation Factor α

When the value of the modulation factor α decreases in the overmodulation state, the sections going into the overmodulation state decrease, and eventually only k=INT(N/4)-section is in the overmodulation state.

The k=INT(N/4)-section also goes into the normal modulation state when the modulation factor α decreases below the lower limit of the overmodulation state, so that the k-section in the overmodulation state disappears and thus all of the k-th sections go into the normal modulation state. In this state, the effects due to the overmodulation, namely the decrease in the number of pulses and the reduction of the switching loss, cannot be obtained.

The modulation factor that enables the sections in the overmodulation state to exist is an overmodulation lower limit value of the modulation factor α in the k=INT(N/4)-section. The overmodulation lower limit value $\alpha_{lower}$ of the modulation factor α is expressed by the following formula (7) based on the condition expression of the overmodulation state indicated by the expression (5).

$$\alpha_{lower} = 1/\sin\left[2\pi\left\{INT\left(N/4\right)+1/4\right\}/N\right] \tag{7}$$

The term "INT(n)" in the formula (7) is a function that sends an integer back by dropping the fractional portion of an object parameter n, and the term "INT(N/4)" is an integer part that is one-quarter of the number of pulses N and represents the number of pulses included in a quarter period of the modulation wave S.

When the modulation factor α is lower than the overmodulation lower limit value $\alpha_{lower}$ so as to be α<1/sin[2π{INT(N/4)+1/4}/N], all of the k-th sections go into the normal modulation state. On the other hand, when the modulation factor α exceeds the overmodulation lower limit value $\alpha_{lower}$ so as to be α>1/sin[2π{INT(N/4)+1/4}/N], at least the k=INT(N/4)-section goes into the overmodulation state, and thus the generation of the pulse is prevented in this section. Consequently, the number of pulses decreases, and thereby the switching loss is reduced.

FIG. 4(*b*) illustrates the overmodulation lower limit value $\alpha_{lower}$ of the modulation factor α. The modulation wave S1 (α·sin θ) intersects the carrier wave of the triangular wave at its peak ($\theta_{1k}=\theta_{2k}$) in the k=INT(N/4)-section. When the amplitude of the modulation wave S1 becomes small beyond the point of intersection due to the decrease in the modulation factor α, the k-section in the overmodulation state disappears.

(S1*d*) Range of Modulation Factor α

According to the above condition expression (6) of the upper limit of the modulation factor α and the above condition expression (7) of the lower limit of the modulation factor α, a range of modulation factor α, which is in the overmodulation state and prevents the jump of the pulse width, is expressed by the following formula (8).

$$1/\sin\left[2\pi\left\{INT\left(N/4\right)+1/4\right\}/N\right] < \alpha < 1/\sin\left(\pi/2N\right) \tag{8}$$

Figure 5:
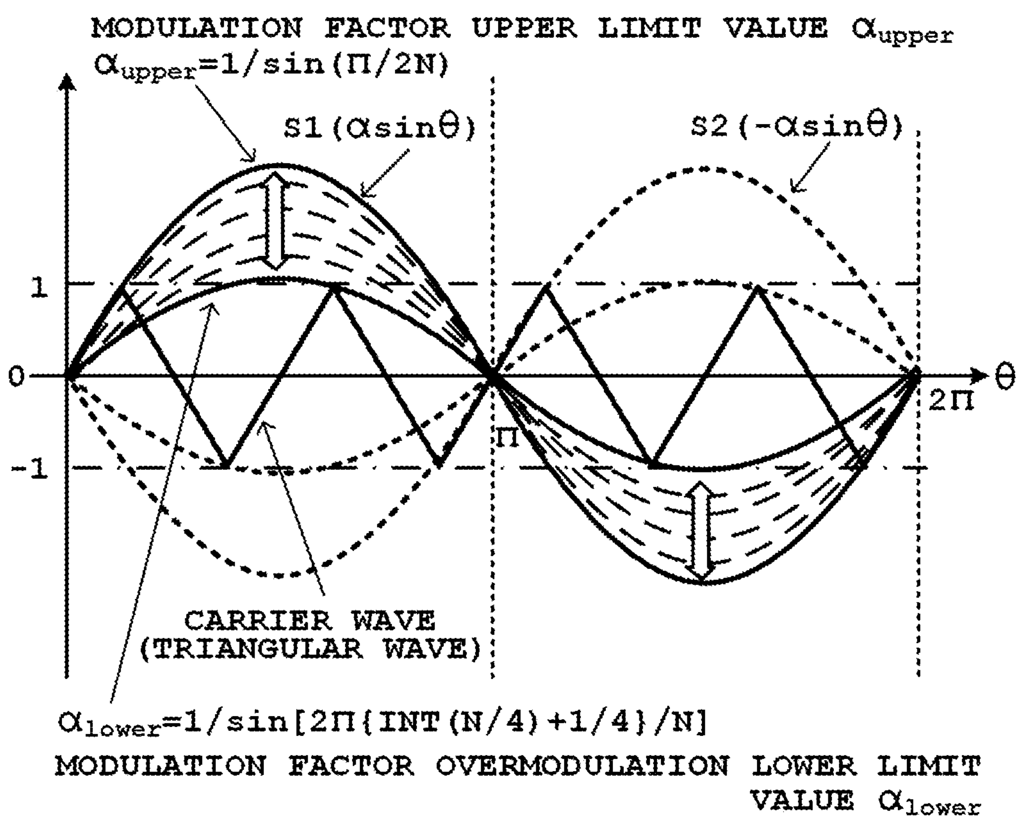
FIG. 5 illustrates a range of the modulation factor $\alpha$ in an overmodulation state.

FIG. 5 schematically shows the range of the modulation factor α to be in the overmodulation state. In regard to the modulation wave S1 shown in FIG. 5, a plurality of broken lines between the overmodulation lower limit value $\alpha_{lower}$ and the upper limit value $\alpha_{upper}$ of the modulation factor α represents the modulation waves S1 in the range of the modulation factor α. The modulation state of the modulation waves S1 present in this range is the overmodulation state, and the occurrence of jump of the pulse width is prevented in this range.

(S2) Fundamental Wave Component Ratio and Harmonic Component Ratio

A general expression of Fourier series without a DC component is expressed by the following equation by using the phase angles $\theta_{1k}$, $\theta_{2k}$ presented in FIG. 3.

$$f(\theta)=\sum_{n=1}^{\infty}=(A_n\cdot\cos\theta_{1k}-B_n\cdot\sin\theta_{2k}) \quad (9)$$

Provided that the coefficient Bn of the Fourier series is $Bn={}^{Ke}{}_{k=0}(B_{nk+}+B_{nk-})$; the range of a $B_{nk+}$-section is defined such that 0 is [2kπ/N to 2(k+1)π/N]; the range of a $B_{nk-}$-section is defined such that θ is [π+2kπ/N to π+2(k+1)π/N]; and the amplitude of the input DC voltage is Vd, the coefficient Bn is expressed by a formular (10) according to a θ-section shown in FIG. 3. Since the modulation wave and the carrier wave are odd functions, the coefficient An=0.

$$B_n=(4/n\pi)\cdot Vd\cdot\left\{1-\sum_{k=0}^{Ke}(\cos(n\cdot\theta_{1k})-\cos(n\cdot\theta_{2k})\right\} \quad (10)$$

The formula (10) expresses harmonic components in the entire regions from the normal modulation region to the overmodulation region. The coefficient $B_1$ when n=1 represents a fundamental wave component, and the coefficients $B_3$ and $B_5$ when n=3 and n=5, respectively, represent the third harmonic component and the fifth harmonic component.

Now, a fundamental wave component ratio $B_1$/Vd and harmonic component ratios $B_3/B_1$, $B_5/B_1$ will be described.

(S2*a*) Fundamental Wave Component Ratio $B_1$/Vd

The use of the overmodulation region can increase the efficiency due to the reduction in the switching loss and expand the fundamental wave component ratio $B_1$/Vd and the output voltage control range.

Figure 6:
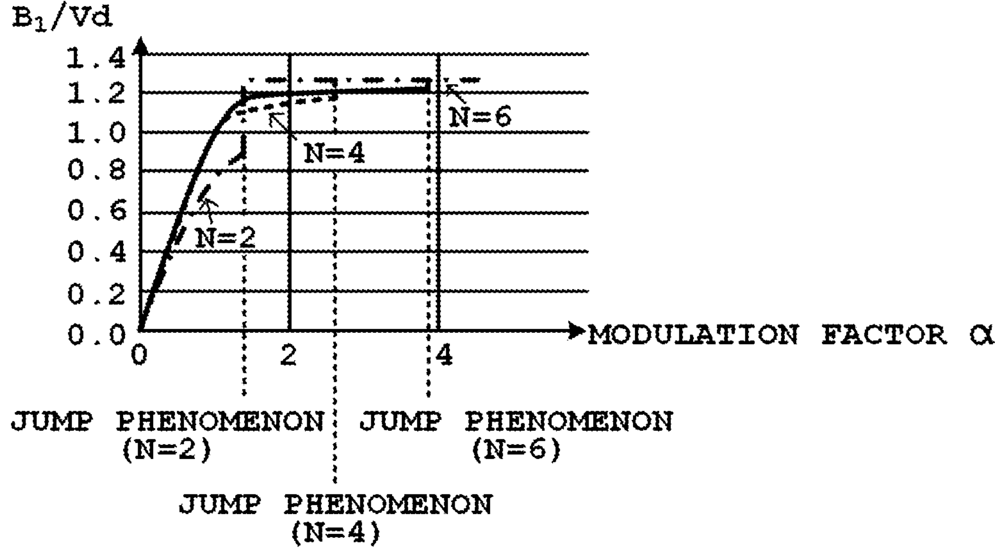
FIG. 6 shows characteristics of a fundamental wave component ratio $B_1/Vd$ with respect to the modulation factor $\alpha$.

The fundamental wave component ratio $B_1$/Vd can be obtained based on the formula (10), in which the number of pulses N is a variable of the phase angles $\theta_{1k}$ and $\theta_{2k}$, so that the ratio $B_1$/Vd is defined with the number of pulses N and the modulation factor α as parameters. FIG. 6 shows the characteristics of the fundamental wave component ratios $B_1$/Vd with respect to the modulation factor α when the number of pulses N is 2, 4 and 6. In FIG. 6, a dashed-dotted line represents the case where the number of pulses N is 2, a broken line represents the case where the number of pulses N is 4, and a solid line represents the case where the number of pulses N is 6.

When the modulation factor α exceeds the upper limit value $\alpha_{upper}$, the pulse width jumps and the jump phenomenon occurs in the fundamental wave component ratio $B_1$/Vd, resulting in the discontinuous values. The range, in which the fundamental wave component ratio $B_1$/Vd continuously varies and no jump occurs in the modulation factor, is narrow when N=2, whereas the range is wide when N=6, and when N=4, the range is intermediate between the cases of N=2 and N=6.

Furthermore, the fundamental wave component ratios $B_1$/Vd when N=4 and N=6 are expanded to 1 or more, so that the fundamental wave component $B_1$ can have the amplitude exceeding the input DC voltage Vd. Consequently, the high output fundamental wave component ratio $B_1$/Vd can be obtained and the range of the output voltage control can be expanded.

(S2*b*) Harmonic Component Ratios $B_3/B_1$, $B_5/B_1$

Figure 7:
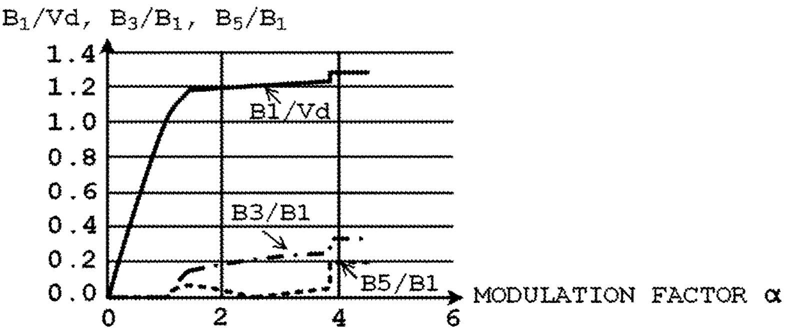
FIG. 7 shows characteristics of the fundamental wave component ratio $B_1/Vd$ and harmonic component ratios $B_3/B_1$ and $B_5/B_1$ with respect to the modulation factor $\alpha$.
Figure 7:
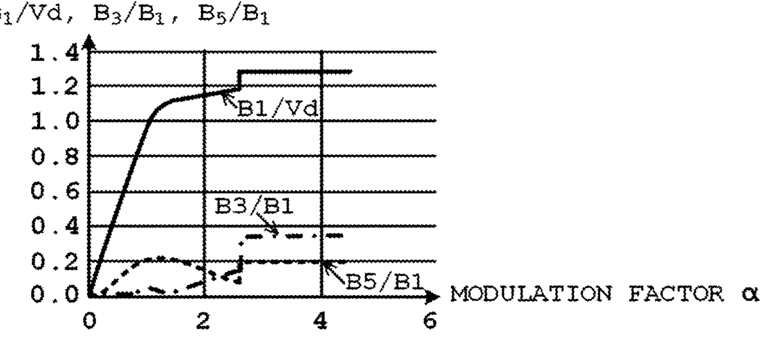
Figure 7:
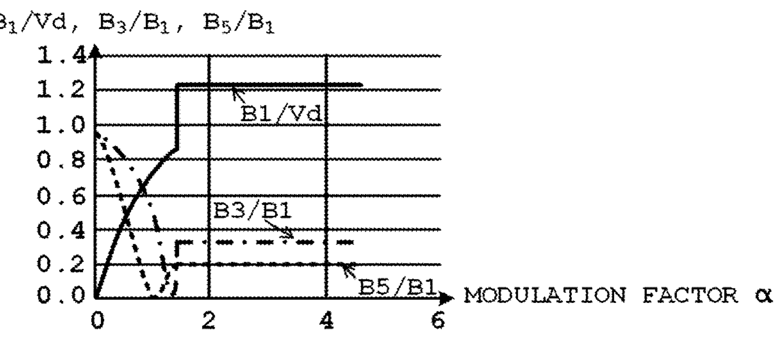

The harmonic component ratios $B_3/B_1$, $B_5/B_1$ can be obtained based on the formula (10) as with the case of the fundamental wave component ratio $B_1$/Vd, and the number of pulses N and the modulation factor α are defined as parameters because the number of pulses N is a variable of the phase angles $\theta_{1K}$ and $\theta_{2k}$. FIG. 7 shows the characteristics of the harmonic component ratios $B_3/B_1$, $B_5/B_1$ with respect to the modulation factor α and the characteristics of the fundamental wave component ratio $B_1$/Vd. FIG. 7(*a*) shows the case where the number of pulses N is 6, FIG. 7(*b*) shows the case where the number of pulses N is 4, and FIG. 7(*c*) shows the case where the number of pulses N is 2. FIG. 7 indicates the harmonic component ratio $B_3/B_1$ with a dashed-dotted line, the harmonic component ratio $B_5/B_1$ with a broken line, and the fundamental wave component ratio $B_1$/Vd with a solid line.

When the pulse width jumps at the upper limit value $\alpha_{upper}$ of the modulation factor α, the values of the harmonic component ratio $B_3/B_1$ and the harmonic component ratio $B_5/B_1$ also become discontinuous, resulting in the occurrence of the jump phenomenon as well as the jump of the pulse width. The characteristics shown in FIG. 7 represents that the harmonic component ratio $B_3/B_1$ and the harmonic component ratio $B_5/B_1$ are large when N=2, are small when N=6, and are intermediate when N=4. It indicates that the lower-order harmonic component ratio $B_3/B_1$ and the harmonic component ratio $B_5/B_1$ decrease with the increase in the number of pulses N.

(S3) Setting of Number of Pulses N

Figure 8:
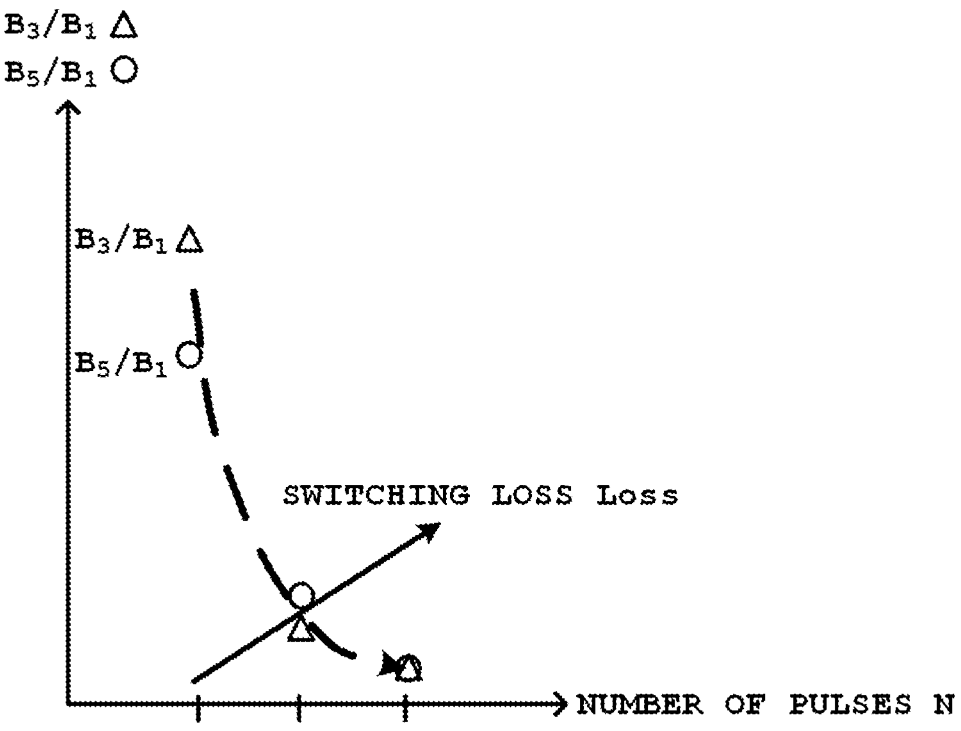
FIG. 8 shows a relationship between a switching loss and the harmonic component ratio $B_3/B_1$ and the harmonic component ratio $B_5/B_1$.

FIG. 8 schematically shows a relationship between a switching loss and the harmonic component ratio $B_3/B_1$ and the harmonic component ratio $B_5/B_1$. The switching loss has a positive relationship characteristic to the increase in the number of pulses N, and the increase in the number of pulses N causes the increase in the switching loss. On the other hand, the harmonic component ratio $B_3/B_1$ and the harmonic component ratio $B_5/B_1$ have a negative relationship characteristic to the increase in the number of pulses N, and the increase in the number of pulses N causes the decrease in the harmonic component ratio $B_3/B_1$ and the harmonic component ratio $B_5/B_1$. These characteristics indicate that there is an increase/decrease relationship between the switching loss and the harmonic component ratio $B_3/B_1$ and the harmonic component ratio $B_5/B_1$ in which the switching loss and the harmonic component ratio $B_3/B_1$ and the harmonic component ratio $B_5/B_1$ are opposite to each other about the increase in the number of pulses N.

In the RF band, it is preferable to use the small number of pulses N for preventing the switching loss, whereas it is preferable to use the large number of pulses N in the overmodulation region for decreasing the harmonic component ratio $B_3/B_1$ and the harmonic component ratio $B_5/B_1$. Thus, the switching loss and the harmonic component ratios $B_3/B_1$, $B_5/B_1$ have a trade-off relationship in terms of the relationship between the switching loss and the harmonic component ratio $B_3/B_1$ and the harmonic component ratio $B_5/B_1$ with respect to the number of pulses N. In this trade-off relationship, the harmonic component ratios increase when the number of pulses N is decreased to prevent the switching loss, whereas the switching loss increases when the number of pulses N is increased to decrease the harmonic component ratios.

Thus, the number of pulses N is set by considering the balance between the characteristics of the switching loss and the harmonic component ratios $B_3/B_1$ and $B_5/B_1$.

By way of example, in the cases where the number of pulses N is 2, 4 and 6, the harmonic component ratio $B_3/B_1$ and the harmonic component ratio $B_5/B_1$ are large and the switching loss is small when the number of pulses is 2, the harmonic component ratio $B_3/B_1$ and the harmonic component ratio $B_5/B_1$ are small and the switching loss is large when the number of pulses is 6, and when the number of pulses N is 4, the harmonic component ratio $B_3/B_1$ and the harmonic component ratio $B_5/B_1$ as well as the switching loss are medium degrees between the cases where the numbers of pulses N are 2 and 6. From this relationship, the number of pulses N of 4 is selected by considering the balance between the switching loss and the harmonic component ratios.

The above selection of the number of pulses N is an example. The selection of the number of pulses depends on which is important to reduce the switching loss or the harmonic component ratios. Thus, the number of pulses N of 2 is selected if the reduction of the switching loss is important, and the number of pulses N of 6 is selected if the reduction of the harmonic component ratios is important, or a larger number of pulses may be selected in either of these reduction cases.

(S4) Setting of Upper Limit Value $\alpha_{upper}$ of Modulation Factor $\alpha$ There is a relationship between the upper limit value $\alpha_{upper}$ of the modulation factor $\alpha$ and the number of pulses N that is expressed by the formula (6), and the upper limit value $\alpha_{upper}$ can be set by using the number of pulses N as a parameter.

(S5) Setting of Modulation Factor

On the basis of the number of pulses N set in the step S3, the modulation factor $\alpha$ is set based on a modulation factor command value $\alpha_{ref}$ with the upper limit value $\alpha_{upper}$ set in the step S4 as the upper limit of the setting value.

(S5*a*) Rated Output Voltage

Figure 9:
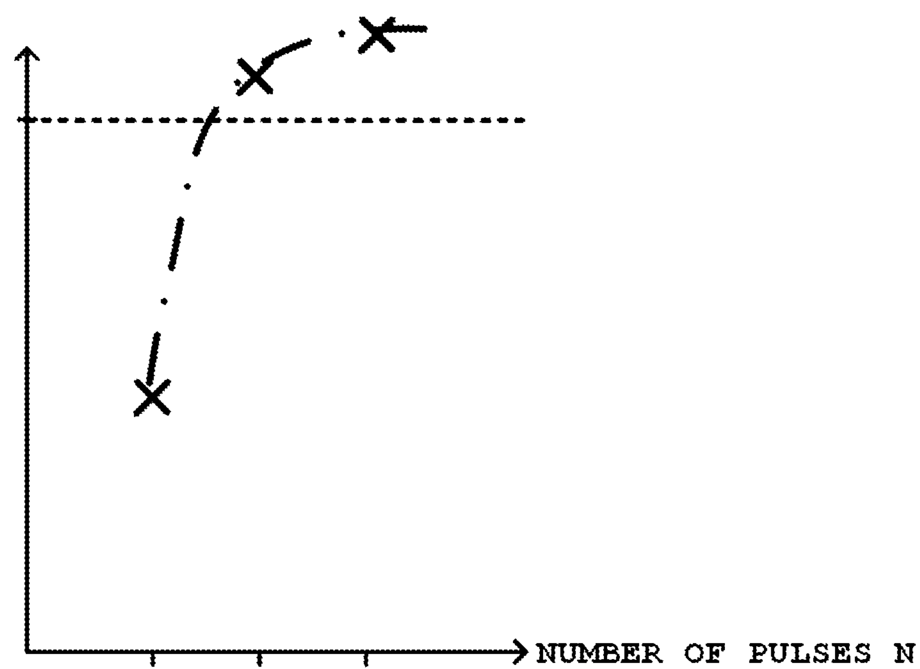
FIG. 9 shows the fundamental wave component ratio $B_1/Vd$ with respect to a number of pulses N.

FIG. 9 shows the fundamental wave component ratio $B_1/Vd$ with respect to the number of pulses N. The fundamental wave component ratio $B_1/Vd$ shown here is a value at which the fundamental wave component ratio $B_1/Vd$ is the largest in the range where no jump occurs in the fundamental wave component ratio $B_1/Vd$ with respect to the modulation factor $\alpha$ shown in FIG. 6, and corresponds to the upper limit value $\alpha_{upper}$ of the modulation factor $\alpha$.

In FIG. 9, the fundamental wave component ratio $B_1/Vd$ is obtained for the number of pulses N set in the step S3, and a rated output voltage is determined based on the value thus obtained. In FIG. 9, Vd is an input DC voltage and $B_1$ is a fundamental wave component, so that the obtained fundamental wave component ratio $B_1/Vd$ is an output voltage with respect to the input DC voltage Vd. From this relationship, when the input DC voltage Vd is input, the fundamental wave component $B_1$ $(=(B_1/Vd)\cdot Vd)$ can be used as an output voltage. In regard to the fundamental wave component ratio $B_1/Vd$ shown in FIG. 9, the modulation factor $\alpha$ is the upper limit value $\alpha_{upper}$, so that the fundamental wave component $B_1$ is the maximum value of the output voltage. The rate output voltage is set in a voltage range that has the output voltage as the upper limit voltage.

(S5*b*) Setting of Modulation Factor

In the relationship of the fundamental wave component ratio $B_1/Vd$ with the modulation factor $\alpha$, the same value as the upper limit value $\alpha_{upper}$ or a smaller value is set as the modulation factor $\alpha$ in the modulation range. FIG. 10 shows the fundamental wave component ratio $B_1/Vd$ with respect to the modulation factor $\alpha$, the modulation factor $\alpha$ includes a range of the normal modulation region and a range of the overmodulation region, and the upper limit of the modulation factor in the overmodulation region is limited by the upper limit value $\alpha_{upper}$.

Furthermore, when the modulation factor command value $\alpha_{ref}$ is smaller than its upper limit value $\alpha_{upper}$, the command value $\alpha_{ref}$ is set as the modulation factor $\alpha$, and when the modulation factor command value $\alpha_{ref}$ is larger than the upper limit value $\alpha_{upper}$, the upper limit value $\alpha_{upper}$ is set as the modulation factor $\alpha$.

Figure 12:
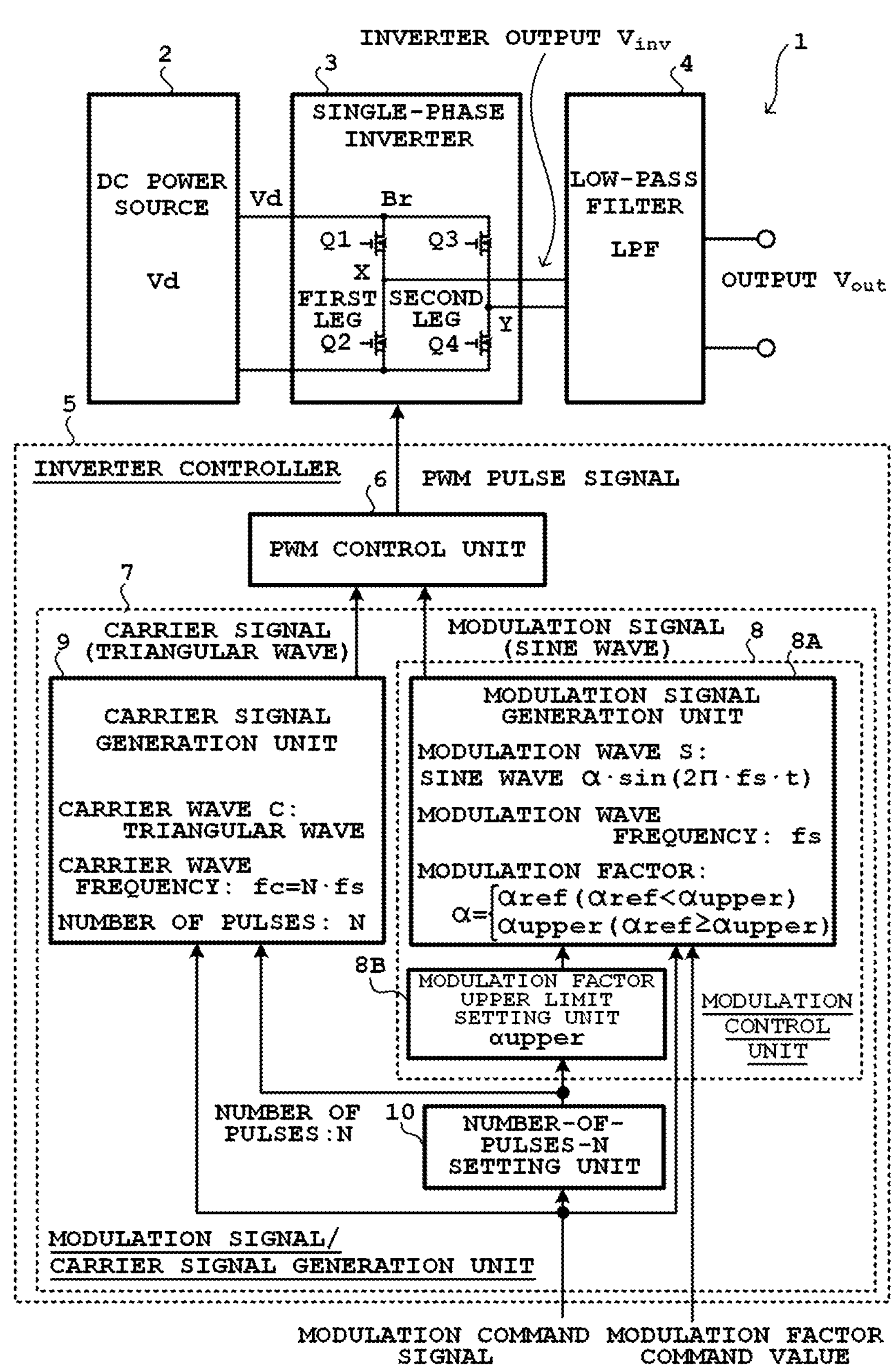
FIG. 12 illustrates a configuration example of the RF band power supply device of the present invention.
Figure 13:
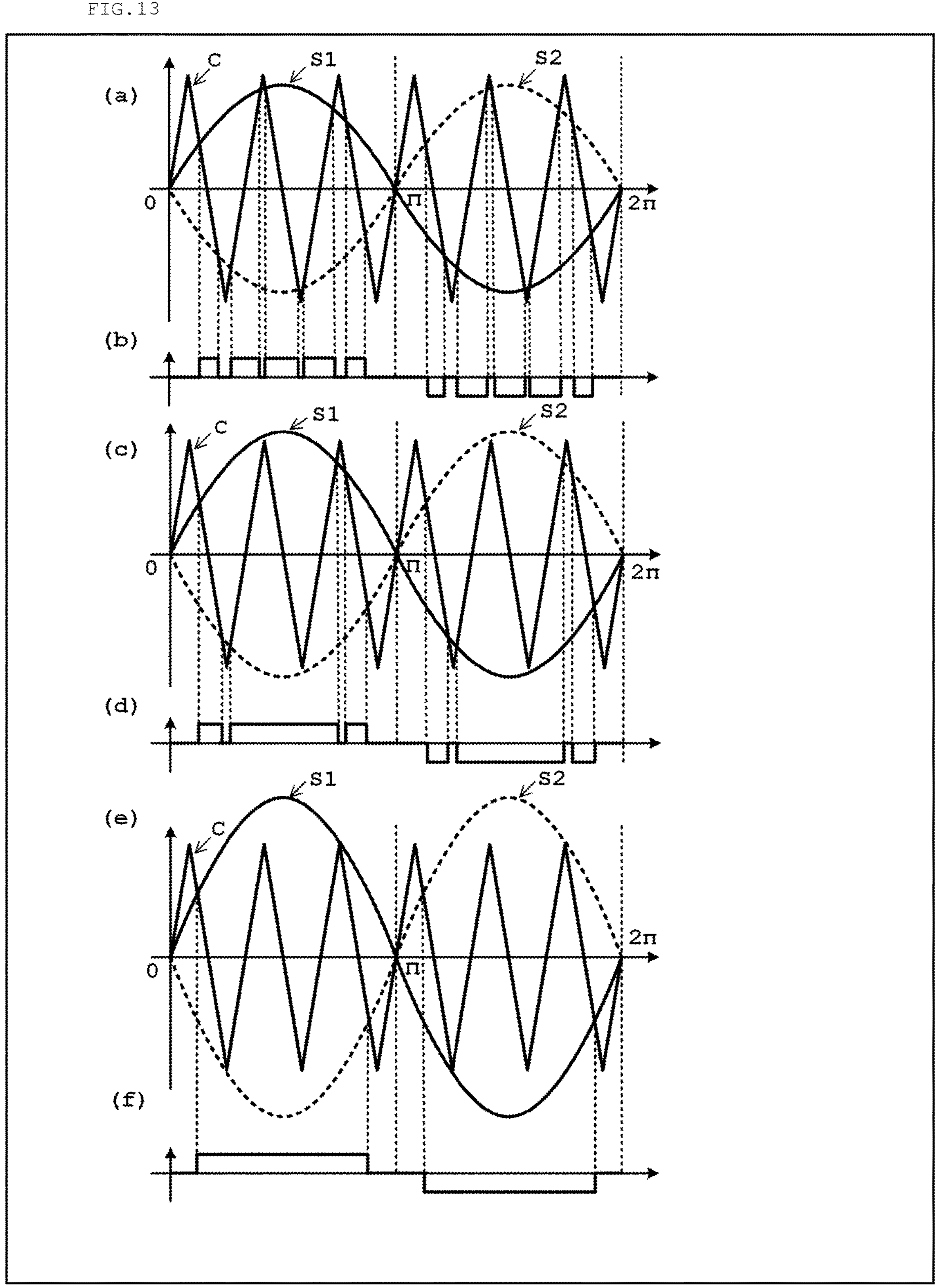
FIG. 13 illustrates normal pulse width control and overmodulation control performed on a single-phase PWM inverter.
Figure 14:
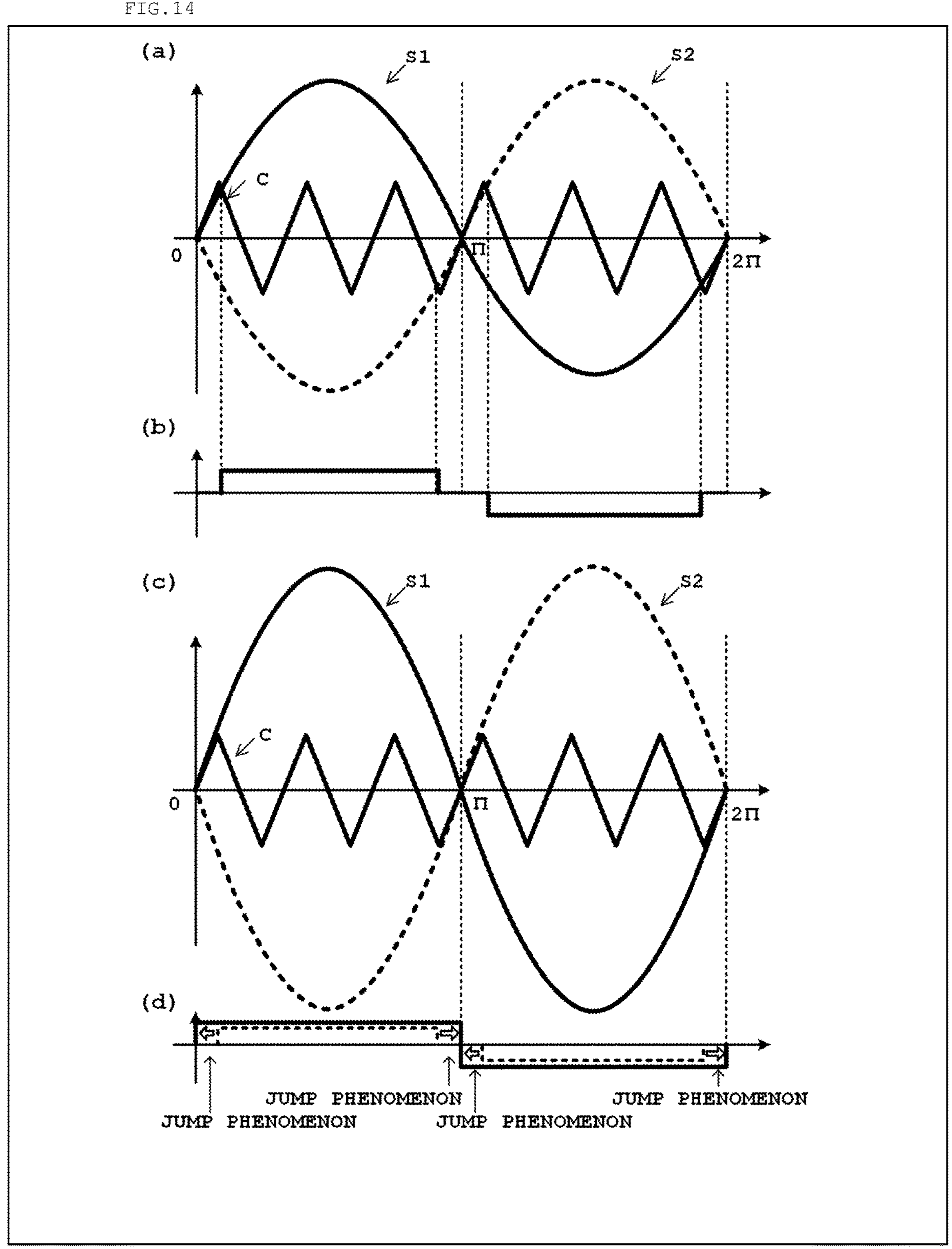
FIG. 14 illustrates a jump phenomenon of a pulse width occurring in the overmodulation control.

However, the modulation factor command value $\alpha_{ref}$ may be given from outside as shown in FIG. 12 or may be set by a modulation signal generation unit 8A.

Simulation Example

FIG. 11 shows a simulation example of the present invention. The simulation example in FIG. 11 defines that N is 4, fs is 150 kHz, a is 0.4 to 2.5, and the rated voltage is set by $B_1/Vd=1.17$, and shows the fundamental wave component ratio $B_1/Vd$ and a total harmonic distortion (THD) of an output voltage with respect to the modulation factor $\alpha$. According to this simulation example, the jump of the fundamental wave ratio $B_1/Vd$ is not observed when the modulation factor $\alpha$ is lower than the upper limit value $\alpha_{upper}$.

The simulation example in FIG. 11 shows that the overmodulation region is utilized to impose the upper limit of the modulation factor, so that a sine wave output voltage that is a high-power output voltage with a harmonic component being suppressed can be obtained. It is to be noted that power efficiency is affected by the conditions of the switching device and others, and this simulation example shows the trend in the power efficiency, so that the values in the figure are one example.

(Configuration Example of RF Band Power Supply Device of Invention)

FIG. 12 is a block diagram illustrating a configuration example of the RF band power supply device of the present invention.

The RF band power supply device 1 includes a DC power source 2 that outputs a DC voltage Vd, a single-phase PWM inverter 3 that converts an input DC voltage supplied by the DC power source 2 into an AC voltage to thereby output an inverter output $V_{inv}$, a low-pass filter (LPF) 4 that removes a harmonic component included in the inverter output $V_{inv}$ output by the single-phase PWM inverter 3 to output a sine wave output $V_{out}$, and an inverter controller 5 that performs PWM control on the single-phase PWM inverter 3. The inverter controller 5 includes a PWM control unit 6 that generates a PWM pulse signal, and a modulation signal/carrier signal generation unit 7 that generates a modulation signal of a sine wave and a carrier signal of a triangular wave and send them to the PWM control unit 6.

The modulation signal/carrier signal generation unit 7 includes a modulation control unit 8 that controls a modulation factor of a modulation signal. The modulation control unit 8 includes a modulation signal generation unit 8A that generates a modulation signal, and a modulation factor upper limit setting unit 8B that defines an upper limit value $\alpha_{upper}$ of a modulation factor $\alpha$.

The modulation signal/carrier signal generation unit 7 further includes a carrier signal generation unit 9 that generates a carrier signal, and a number-of-pulses-N setting unit 10 that sets the number of pulses N. The carrier signal generation unit 9 is configured to generate a carrier signal based on the number of pulses N set by the number-of-pulses-N setting unit 10.

The modulation factor upper limit setting unit 8B and the number-of-pulses-N setting unit 10 may be disposed outside the modulation signal/carrier signal generation unit 7. In addition to that, the modulation factor command value $\alpha_{ref}$ and the number of pulses N may be set beforehand to allow the modulation signal generation unit 8A to use the modulation factor command value $\alpha_{ref}$ to set the modulation factor $\alpha$, and the carrier signal generation unit 9 to use the set number of pulses N to generate a carrier signal.

According to one configuration example, the single-phase PWM inverter 3 consists of a class-D full-bridge amplifier, including a full-bridge circuit Br and an output transformer, not shown, by way of example. The single-phase PWM inverter 3 performs power conversion on the DC voltage Vd of the DC power source in response to a switching operation of the full-bridge circuit to thereby output an inverter output $V_{inv}$ from the output transformer. The full-bridge circuit Br includes four switching elements, i.e., switching elements Q1, Q2, Q3 and Q4. The bridge circuit consists of a series circuit of the switching element Q1 and a switching element Q2 as one "first leg" and the series circuit of the switching element Q3 and the switching element Q4 as the other "second leg". The high voltage sides of the switching elements Q1 and Q3 on upper arm sides of the first leg and the second leg are connected to the high voltage side of the DC power source 2, and the low voltage sides of the switching elements Q2 and Q4 on lower arm sides of the first leg and the second leg are connected to the low voltage side of the DC power source 2. A point X of the first leg and a point Y of the second leg are connected to an input end of an output transformer Tr. The single-phase PWM inverter 3 switches the ON/OFF operation between the switching elements Q1, Q2 and the switching elements Q3, Q4 by using gate signals (PWM pulse signals) to convert the DC voltage into the AC voltage, thereby outputting the inverter output $V_{inv}$.

A configuration may be adopted that the switching elements Q1 to Q4 are connected to a freewheeling diode in parallel, and that when the switching element is turned from an ON state to an OFF state, a current flowing backward is passed through the freewheeling diode to prevent damage to the switching element. In here, the designations "first leg" and "second leg" are used for the sake of explanation.

The low-pass filter 4 is configured to remove a harmonic component included in the inverter output $V_{inv}$ of the single-phase PWM inverter 3 and to output a sine wave output $V_{out}$. The low-pass filter 4 is connected to an output side of the output transformer Tr to input the inverter output Vin, obtained by the power conversion on the DC voltage into the AC voltage performed by the single-phase PWM inverter 3. The low-pass filter 4 is composed of an LC circuit formed by an inductor and a capacitor, for instance, and is configured to remove the harmonic component included in the inverter output $V_{inv}$ to thereby supply the obtained sine wave output $V_{out}$ to a load. A cutoff frequency of the low-pass filter 4 is set according to a frequency fs of the sine wave output $V_{out}$.

The PWM control unit 6 generates a gate signal (PWM pulse signal) by comparing a modulation signal of a modulation wave S with a carrier signal of a carrier wave C. The gate signal (PWM pulse signal) is a PWM pulse signal for controlling the ON/OFF operations of the switching elements Q1 to Q4 included in the single-phase PWM inverter 3. In the first leg having the switching element Q1 and the switching element Q2 connected to each other in series, the gate signal (PWM pulse signal) for controlling the switching element Q1 and the gate signal (PWM pulse signal) for controlling the switching element Q2 have an inverted signal relationship. Between the gate signals, a dead time is set for preventing both switching elements from turning ON at the same time so that a short-circuit can be prevented between positive and negative terminals of the DC power source 2. There is the same signal relationship in the second leg in which the switching element Q3 and the switching element Q4 are connected in series, and a dead time is also set.

The modulation signal generation unit 8A is configured to generate a modulation signal based on a modulation command signal and the modulation factor command value $\alpha_{ref}$. The modulation command signal gives instructions on the signal waveform of the modulation signal and the modulation wave frequency fs. The signal waveform of the modulation signal is a sine wave, and thus an output voltage of the RF band power supply device is defined to be a sine wave. The modulation factor $\alpha$ is set in the modulation range of which upper limit is the upper limit value Cupper of the modulation factor $\alpha$, so as to generate a modulation signal $\alpha \cdot \sin(2\pi \cdot fs \cdot t)$.

The modulation factor is set, as shown in the step (S5*b*), in such a way that when the modulation factor command value $\alpha_{ref}$ is smaller than the upper limit value $\alpha_{upper}$, the value $\alpha_{ref}$ is set as the modulation factor $\alpha$, and when the modulation factor command value $\alpha_{ref}$ is larger than the upper limit value $\alpha_{upper}$, the value $\alpha_{upper}$ is set as the modulation factor $\alpha$.

The modulation factor upper limit setting unit 8B sets the upper limit value $\alpha_{upper}$ of the modulation factor $\alpha$ based on the number of pulses N set in the step (S3), as shown in the step (S4).

The limitation of the upper limit value $\alpha_{upper}$, which is the upper limit of the modulation factor $\alpha$, can prevent a jump phenomenon that causes the discontinuity in pulse widths and fundamental wave component ratios $B_1$/Vd.

The carrier signal generation unit 9 generates a carrier signal based on the modulation command signal and the number of pulses N. The modulation command signal gives the instruction on the modulation wave frequency fs. The carrier signal generation unit 9 generates a triangular wave as the carrier wave C. The carrier signal generation unit 9 sets a frequency N·fs as a carrier wave frequency fc, the frequency N·fs being obtained by multiplying the modulation wave frequency fs by the number of pulses N.

The number-of-pulses-N setting unit 10 sets the number of pulses N. The number of pulses N is set, as shown in the step (S3), based on the characteristics of the switching loss and the harmonic component ratios $B_3/B_1$ and $B_5/B_1$ by considering the balance between the characteristics. The number of pulses N set in the number-of-pulses-N setting unit 10 is used for setting the upper limit value $\alpha_{upper}$ of the modulation factor $\alpha$ performed by the modulation factor upper limit setting unit 8B and for generating the carrier signal of the carrier wave C in the carrier signal generation unit 9.

INDUSTRIAL APPLICABILITY

The RF band power supply device and the pulse width modulation control method of the present invention can be applied to a radio-frequency power supply (RF generator) to be used for semiconductor manufacturing equipment, liquid crystal panel manufacturing equipment or others.

REFERENCE SIGNS LIST

1 RF Band Power Supply Device
2 DC Power Source
3 Single-Phase PWM Inverter
4 Low-Pass Filter
5 Inverter Controller
6 PWM Control Unit
7 Modulation Signal/Carrier Signal Generation Unit
8 Modulation Control Unit
8A Modulation Signal Generation Unit
8B Modulation Factor Upper Limit Setting Unit
9 Carrier Signal Generation Unit
10 Number-Of-Pulses-N Setting Unit
fc Carrier Wave Frequency
fs Modulation Wave Frequency
C Carrier Signal
S Modulation Signal
N Number of Pulses
Q1, Q2, Q3, Q4 Switching Element
Vd DC voltage
$V_{inv}$ Inverter Output
$V_{out}$ Sine Wave Output
α Modulation Factor
$\alpha_{ref}$ Modulation Factor Command Value
$\alpha_{upper}$ Upper Limit Value of Modulation Factor
$\alpha_{lower}$ Overmodulation Lower Limit Value of Modulation Factor

The invention claimed is:

1. A radio frequency (RF) band power supply device, comprising:

a DC power source;

a single-phase pulse width modulation (PWM) inverter that converts a direct current supplied from the DC power source into an alternate current;

a low-pass filter circuit that removes a harmonic component included in an AC output from the single-phase PWM inverter to thereby output a sine wave; and an inverter controller that performs pulse width modulation on the single-phase PWM inverter, wherein the inverter controller comprises a PWM control unit configured to generate a PWM pulse signal to be used for the pulse width modulation by comparing a sine wave modulation signal with a triangular wave carrier signal, and a modulation signal/carrier signal generation unit that generates the sine wave modulation signal and the triangular wave carrier signal, wherein the modulation signal/carrier signal generation unit comprises a modulation control unit configured to control a modulation factor of the sine wave modulation signal, the modulation control unit being configured to:

(a) define the modulation factor in an overmodulation region to be less than a threshold value of the modulation factor at which a pulse width of the PWM pulse signal jumps to another pulse width with a duty ratio of 50%, so as to limit an upper limit value of the modulation factor, and remain the modulation factor, in the overmodulation region, to be greater than an overmodulation lower limit value of the modulation factor, thereby maintaining continuity of pulse widths of the PWM pulse signal, and (b) make the modulation factor to possess the continuity from a normal modulation region to the overmodulation region so as to make a modulation wave of the sine wave modulation signal to be a sine wave that is continuous from the normal modulation region to the overmodulation region;

wherein when a pulse count is N, the threshold value of the modulation factor is 1/sin(π/2N), where N is an integer equal to or greater than 1, that is defined as the upper limit value of the modulation factor.

2. The RF band power supply device according to claim 1, wherein the modulation control unit comprises a modulation factor upper limit setting unit, and a modulation signal generation unit that sets the modulation factor within a range.

3. The RF band power supply device according to claim 1, wherein the modulation wave comes into contact at a contact point with a peak of a carrier wave of the triangular wave carrier signal at an edge of an inner circumference of one period of the modulation wave, and at the contact point, the threshold value of the modulation factor remaining in the normal modulation region is defined as the upper limit value of the modulation factor.

4. The RF band power supply device according to claim 1, wherein the modulation wave comes into contact at a contact point with a peak of a carrier wave of the triangular wave carrier signal, and at the contact point, the threshold value of the modulation factor remaining in the overmodulation region is defined as the overmodulation lower limit value of the modulation factor.

5. The RF band power supply device according to claim 1, wherein when the pulse count is N, the modulation factor at a boundary between the overmodulation region and the normal modulation region is 1/sin [2π{INT(N/4)+1/4}/N] that is defined as the overmodulation lower limit value of the modulation factor.

6. The RF band power supply device according to claim 1, wherein the modulation signal/carrier signal generation unit further comprises a carrier signal generation unit, the modulation control unit comprises a modulation signal generation unit configured to generate the modulation wave α·sin(2π·fs·t) of the sine wave modulation signal based on a modulation wave frequency fs and the modulation factor α controlled by the modulation control unit, where t is time, and the carrier signal generation unit is configured to generate a triangular wave of the triangular wave carrier signal with a carrier frequency fc=N·fs based on the modulation wave frequency fs and the pulse count N.

7. A pulse width modulation control method for a single-phase pulse width modulation (PWM) inverter that performs pulse width modulation control on the single-phase PWM inverter by using a gate signal as a PWM pulse signal, the gate signal being generated based on a comparison between two modulation waves of a modulation signal having opposite phases in a radio frequency (RF) band and a carrier wave of a carrier signal, and outputs a sine wave in the RF band, wherein a modulation wave of the modulation signal is a sine wave and the carrier wave of the carrier signal is a triangular wave, the modulation signal being modulated from a normal modulation region to an overmodulation region to:

(a) define a modulation factor in the overmodulation region to be less than a threshold value of the modulation factor at which a pulse width of the PWM pulse signal jumps to another pulse width with a duty ratio of 50%, so as to impose an upper limit value of the modulation factor, and remain the modulation factor, in the overmodulation region, to be greater than an overmodulation lower limit value of the modulation factor, thereby maintaining continuity of pulse widths of the PWM pulse signal, and (b) make the modulation factor to possess the continuity from the normal modulation region to the overmodulation region so as to make the modulation wave of the modulation signal to be a sine wave that is continuous from the normal modulation region to the overmodulation region;

wherein when a pulse count is N, the threshold value of the modulation factor is $1/\sin(\pi/2N)$, where N is an integer equal to or greater than 1, that is defined as the upper limit value of the modulation factor.

8. The pulse width modulation control method according to claim 7, wherein the modulation wave comes into contact at a contact point with a peak of the carrier wave at an edge of an inner circumference of one period of the modulation wave, and at the contact point, the threshold value of the modulation factor remaining in the normal modulation region is defined as the upper limit value of the modulation factor.

9. The pulse width modulation control method according to claim 7, wherein the modulation wave comes into contact at a contact point with a peak of the carrier wave, and at the contact point, the threshold value of the modulation factor remaining in the overmodulation region is defined as the overmodulation lower limit value of the modulation factor.

10. The pulse width modulation control method according to claim 7, wherein when the pulse count is N, the modulation factor at a boundary between the overmodulation region and the normal modulation region is $1/\sin[2\pi\{INT(N/4)+1/4\}/N]$ that is defined as the overmodulation lower limit value of the modulation factor.

11. The pulse width modulation control method according to claim 7, wherein the modulation wave $\alpha\cdot\sin(2\pi\cdot fs\cdot t)$ of the modulation signal is generated based on a modulation wave frequency fs and the modulation factor $\alpha$, where t is time, and the triangular wave of the carrier signal with a carrier frequency $fc=N\cdot fs$ is generated based on the modulation wave frequency fs and the pulse count N.

* * * * *